US010488565B2

(12) United States Patent
Matsuo et al.

(10) Patent No.: US 10,488,565 B2
(45) Date of Patent: *Nov. 26, 2019

(54) DISPERSION LIQUID FOR FORMING TRANSPARENT LIGHT SCATTERING LAYER OF TRANSPARENT SCREEN, TRANSPARENT SCREEN, AND METHOD FOR MANUFACTURE OF TRANSPARENT SCREEN

(71) Applicant: JXTG NIPPON OIL & ENERGY CORPORATION, Tokyo (JP)

(72) Inventors: Akira Matsuo, Tokyo-to (JP); Kousuke Yamaki, Tokyo-to (JP); Sayako Uchizawa, Tokyo-to (JP)

(73) Assignee: JXTG NIPPON OIL & ENERGY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/744,347

(22) PCT Filed: Jun. 16, 2016

(86) PCT No.: PCT/JP2016/067873
§ 371 (c)(1),
(2) Date: Jan. 12, 2018

(87) PCT Pub. No.: WO2017/010217
PCT Pub. Date: Jan. 19, 2017

(65) Prior Publication Data
US 2018/0203167 A1 Jul. 19, 2018

(30) Foreign Application Priority Data

Jul. 15, 2015 (JP) .................................. 2015-141495
Oct. 27, 2015 (JP) .................................. 2015-211248

(51) Int. Cl.
*G02B 5/02* (2006.01)
*G03B 21/62* (2014.01)

(52) U.S. Cl.
CPC ......... *G02B 5/0278* (2013.01); *G02B 5/0242* (2013.01); *G02B 5/0268* (2013.01); *G02B 5/0284* (2013.01); *G03B 21/62* (2013.01)

(58) Field of Classification Search
CPC ...................................................... G03B 21/62
(Continued)

(56) References Cited

U.S. PATENT DOCUMENTS 9,946,147 B2 * 4/2018 Ide .......................... G03B 21/62
9,952,494 B2 * 4/2018 Tao .......................... G02B 5/02
(Continued)

FOREIGN PATENT DOCUMENTS

JP 5-119402 5/1993
JP 10-104747 4/1998
(Continued)

OTHER PUBLICATIONS

International Preliminary Report on Patentability dated Jan. 25, 2018 in International Application No. PCT/JP2016/067873.
(Continued)

*Primary Examiner* — Christopher E Mahoney
(74) *Attorney, Agent, or Firm* — Wenderoth, Lind & Ponack, L.L.P.

(57) ABSTRACT

Provided is a dispersion liquid, a transparent screen, and a method for manufacture of the transparent screen, which the dispersion liquid is for forming a transparent light scattering layer of the transparent screen that is capable of satisfying both visibility of a projection light and a transmission light by anisotropically scattering and reflecting the projection light emitting from a light source. The dispersion liquid comprises a binder and at least either one of bright flake-
(Continued)

form microparticles or substantially spherical microparticles. The transparent screen also comprises a cured film of the above-described dispersion liquid. Further, the method for manufacturing a transparent screen comprising a transparent light scattering layer is characterized by forming the transparent light scattering layer by coating and curing the above-described dispersion liquid on a substrate.

19 Claims, 1 Drawing Sheet

(58) Field of Classification Search
USPC .......................................................... 359/452
See application file for complete search history.

(56) References Cited

U.S. PATENT DOCUMENTS

| 10,018,754 B2* | 7/2018 | Matsuo | ...................... B32B 7/02 |
| 2014/0185282 A1* | 7/2014 | Hsu | ........................... F21V 9/08 362/231 |

FOREIGN PATENT DOCUMENTS

| JP | 10-197957 | 7/1998 |
| JP | 2001-242546 | 9/2001 |
| JP | 2007-171468 | 7/2007 |
| JP | 2010-072282 | 4/2010 |
| JP | 2010-79197 | 4/2010 |
| JP | 2010-250288 | 11/2010 |
| JP | 2011-13302 | 1/2011 |
| JP | 2013-210505 | 10/2013 |
| JP | 2015-4789 | 1/2015 |
| JP | 2015-31702 | 2/2015 |

OTHER PUBLICATIONS

International Search Report dated Sep. 20, 2016 in International Application No. PCT/JP2016/067873.

Japanese Office Action dated Mar. 14, 2017 in corresponding Japanese patent application No. 2017-506938, with Machine translation.

Japanese Office Action dated May 19, 2017 in corresponding Japanese patent application No. 2017-506938, with Machine translation.

* cited by examiner

DISPERSION LIQUID FOR FORMING TRANSPARENT LIGHT SCATTERING LAYER OF TRANSPARENT SCREEN, TRANSPARENT SCREEN, AND METHOD FOR MANUFACTURE OF TRANSPARENT SCREEN

TECHNICAL FIELD

The present invention relates to a dispersion liquid, a transparent screen, and a method for manufacture of the transparent screen, which the dispersion liquid is for forming a transparent light scattering layer of the transparent screen that is capable of satisfying both visibility of a projection light and a transmission light by anisotropically scattering and reflecting the projection light emitting from a light source. The present invention also relates to a video image projection system comprising the transparent screen and a projection device.

BACKGROUND ART

Conventionally, a combination of a Fresnel lens sheet and a lenticular lens sheet has been used for a projector screen. In recent years, a demand for displaying merchandise information, advertisement, or the like by projection on a show window of a department store or the like, a transparent partition of an event venue, or the like while maintaining the transparency thereof is growing. It is said that, in the future, a demand for a highly transparent projection type image display screen which is used for a head-up display, a wearable display, or the like will be further increasing.

There are two types of projection type image display screens: a reflection type screen and a transmission type screen. The reflection type screen is a screen for visually confirming an image projected on the screen from the same side as the projector, and the transmission type screen is a screen for visually confirming an image projected on the screen from the opposite side of the projector beyond the screen. As for the reflection type screen, there is proposed a reflection type for a projector comprising a light scattering reflection layer which comprises a binder resin, a light reflection agent, and 50 parts by weight or more of a light scattering agent based on 100 parts by weight of the light reflection agent, on a substrate (see Patent Document 1). Further, a reflection type screening screen is proposed, characterized by comprising a reflection layer on a substrate with a coating containing high light-brilliance aluminum powder (see Patent Document 2). As for the transmission type screen, for example, there is proposed a transmission type screen for a projector comprising a light suppressing sheet with multiple unit light transmission parts, a light suppressing sheet with multiple unit light absorbing parts, and a layered body of light scattering layers (see Patent Document 3).

RELATED ART DOCUMENTS

Patent Documents

Patent Document 1 Japanese Unexamined Patent Application Publication No. H10-197957
Patent Document 2 Japanese Unexamined Patent Application Publication No. H5-119402
Patent Document 3 Japanese Unexamined Patent Application Publication No. 2013-210505

SUMMARY OF THE INVENTION

Problems to be Solved by the Invention

However, the present inventors found the following technical problems in Patent Documents 1 to 3. The screen for a projector described in Patent Document 1 had poor transparency and it was difficult to be used as a transparent screen application such as a head-up display, a wearable display, or the like. Further, in Patent Document 1, the film in which the light reflection agent and microparticles of the light dispersion agent were dispersed was formed by melt-extrusion, resulting in a poor dispersibility of the microparticles and a risk of causing foreign substances. The melt-extrusion process also had a problem that it was difficult to mold in shapes other than a plane surface, such as a curved surface or a convexoconcave shape. The reflection type screening screen as described in Patent Document 2 had poor transparency and it was difficult to be used as a transparent screen application such as a head-up display, a wearable display, or the like. The transmission type screening screen as described in Patent Document 3 comprises a light suppressing sheet with multiple unit light transmission parts, a light suppressing sheet with multiple unit light absorbing parts, where the light suppressing sheet involved complicated manufacturing steps, and also there was a problem that the transparency as a screen is impaired since the light absorbing parts existed.

Means for Solving the Problems

The present inventors found that when a transparent screen is manufactured using a transparent screen comprising a conventional transparent light scattering layer, there were technical problems that it was difficult to adhere the transparent film to a substrate or a support in shapes other than a plane surface, such as a curved surface or a convexoconcave shape, and that it was difficult to adjust the size of the transparent film. The present invention has been made in view of the above-described technical problems, and an object of the present invention is to provide a dispersion liquid, a transparent screen, and a method for manufacture of the transparent screen, which the dispersion liquid is for forming a transparent light scattering layer of the transparent screen that is capable of satisfying both visibility of a projection light and a transmission light by anisotropically scattering and reflecting the projection light emitting from a light source. An object of the present invention is also to provide a video image projection system comprising the transparent screen.

In order to solve the above-described technical problems, the present inventors intensively studied to find that the above-described technical problems can be solved by using a cured film from a dispersion liquid, in which at least either one of bright flake-form microparticles or substantially spherical microparticles are dispersed in a binder, to form the transparent light scattering layer of the transparent screen. The present invention has been completed based on such findings.

That is, according to one aspect of the present invention, provided is
a dispersion liquid for forming a transparent light scattering layer of a transparent screen, which the dispersion liquid comprises a binder and at least either one of bright flake-form microparticles or substantially spherical microparticles.

According to one aspect of the present invention, the binder is preferably an inorganic binder or an organic binder.

According to one aspect of the present invention, the inorganic binder is preferably liquid glass, a glass material having a low softening point, or a sol-gel material.

According to one aspect of the present invention, the organic binder is preferably a thermoplastic resin, an ionizing radiation-curable resin, a thermoset resin, or an adhesive.

According to one aspect of the present invention, the dispersion liquid preferably further comprises a solvent.

According to one aspect of the present invention, primary particles of the bright flake-form microparticles preferably have an average diameter of from 0.01 to 100 μm and an average aspect ratio of from 3 to 800.

According to one aspect of the present invention, the bright flake-form microparticles are preferably metallic particles selected from the group consisting of aluminum, silver, copper, platinum, gold, titanium, nickel, tin, tin-cobalt alloy, indium, chromium, titanium oxide, aluminum oxide, and zinc sulfide, a bright material of a glass coated with metallic oxides or metal, or a bright material of natural or synthetic mica coated with metal or metallic oxides.

According to one aspect of the present invention, the content of the bright flake-form microparticles in the dispersion liquid is preferably 0.0001 to 10.0% by mass based on the binder.

According to one aspect of the present invention, primary particles of the substantially spherical microparticles preferably have an average diameter of from 0.1 to 500 nm.

According to one aspect of the present invention, the substantially spherical microparticles are preferably at least one kind selected from the group consisting of zirconium oxide, zinc oxide, cerium oxide, barium titanate, magnesium oxide, barium sulfate, calcium carbonate, diamond, strontium titanate, a cross-linked acrylic resin, a cross-linked styrene resin, and silica.

According to one aspect of the present invention, the content of the substantially spherical microparticles in the dispersion liquid is preferably 0.0001 to 20.0% by mass based on the binder.

According to one aspect of the present invention, the cured film preferably have a haze value of 30% or less when the dispersion liquid was cured to make a 2 μm-thick cured film.

In another aspect of the present invention, a cured film from the above-described dispersion liquid is provided.

In another aspect of the present invention, the thickness of the above-described cured film t (μm) and the concentration c (% by mass) of the above-described bright flake-form microparticles and/or the above-described substantially spherical microparticles based on the binder preferably satisfy the following formula (I):

$$0.05 \leq (t \times c) \leq 50 \quad \text{(I)}.$$

In another aspect of the present invention, the above-described cured film preferably has a haze value of 30% or less.

According to another aspect of the present invention, there is provided a transparent screen comprising a transparent light scattering layer which comprises the above-described cured film.

According to another aspect of the present invention, there is provided a method for manufacturing a transparent screen comprising a transparent light scattering layer, characterized by forming a transparent light scattering layer comprising a cured film by coating and curing the above-described dispersion liquid on the substrate.

According to another aspect of the present invention, there is provided a member for a vehicle comprising the above-described transparent screen.

According to another aspect of the present invention, there is provided a member for a building comprising the above-described transparent screen.

In another aspect of the present invention, there is provided a video image projection system comprising the above-described transparent screen and a projection device.

Effects of the Invention

According to the present invention, it is possible to provide a dispersion liquid, a transparent screen, and a method for manufacture of the transparent screen, which the dispersion liquid is for forming a transparent light scattering layer of the transparent screen that is capable of satisfying both visibility of a projection light and a transmission light by anisotropically scattering and reflecting the projection light emitting from a light source. The use of such dispersion liquid will allow formation of the transparent light scattering layer even in shapes other than a plane surface, such as a curved surface or a convexoconcave shape without relying on the surface shapes of the substrate and the support, and adjustment of the size of the transparent light scattering layer. Such transparent screen is also suitable for use in, for example, a glass window, a head-up display, and a wearable display.

MODE FOR CARRYING OUT THE INVENTION

<Dispersion Liquid>

Figure 1:
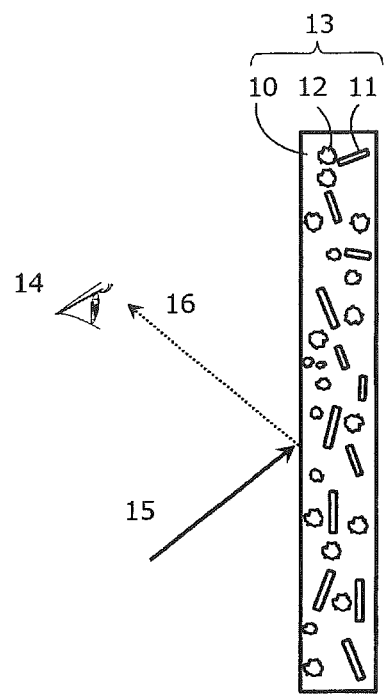
FIG. 1 is a cross-sectional view in the thickness direction of one embodiment of a transparent screen according to the present invention.

A dispersion liquid according to the present invention is for forming a transparent light scattering layer of a transparent screen and comprises a binder and at least either one of bright flake-form microparticles or substantially spherical microparticles. The dispersion liquid according to the present invention may further comprise a solvent. As for the microparticles, the substantially spherical microparticles or bright flake-form microparticles described below may be suitably used. The transparent light scattering layer formed by use of such dispersion liquid will allow anisotropical scattering and reflecting of the light in the transparent light scattering layer and improve use efficacy of the light. The use of such dispersion liquid will also allow formation of the transparent light scattering layer even in shapes other than a plane surface, such as a curved surface or a convexoconcave shape without relying on the surface shapes of the substrate and the support, and adjustment of the size of the transparent light scattering layer.

(Binder)

Any kind of materials may be used for the binder, provided that it has a high transparency when a cured film is formed and a good dispersibility of the bright flake-form microparticles or the substantially spherical microparticles, and preferably, the material is transparent. Preference is made to the use of an inorganic binder or an organic binder.

Examples of the highly transparent inorganic binder include liquid glass, a glass material having a low softening point, or a sol-gel material. Liquid glass is a solution rich in alkali silicate and normally sodium is contained as an alkali metal. A representative liquid glass can be expressed by $Na_2O \cdot nSiO_2$ (n: a given number of a positive value). Commercially available liquid glass includes sodium silicate solution Nos. 1 to 3 and the ratio of $SiO_2$ to $Na_2O$ becomes higher in this order. When water content was evaporated from the liquid glass, a shatter-resistant and elastic solid is formed containing about 10 to 30% by mass of water content called hydrated glass, whereby a function as a binder having an adherence property is exhibited. Optionally, $K_2O$ may be partly included in place of $Na_2O$. However, even in such case, the molar ratio with $SiO_2$ is preferably within the above-described range. As for the function as a binder, higher molecular weight of the poly silicate ion contained in the liquid glass tends to form a cured film with a high mechanical intensity; however, sometimes cracks can be easily formed in the cured film. Therefore, liquid glass is preferably used with an optimal molar ratio of $SiO_2$ to $Na_2O$, depending on, for example, concentration or pH and proportion to hydroxyapatite of the liquid glass to be contained when in use as a coating liquid. Sodium silicate manufactured by Fuji Kagaku Corp. can be used as liquid glass.

The glass material having a low softening point is a glass having a softening temperature preferably in the range from 150 to 620° C., more preferably from 200 to 600° C., most preferably from 250 to 550° C. Such glass materials include a lead-free low softening point glass, or the like, obtainable by thermal treatment of a mixture comprising $PbO$—$B_2O_3$ based, $PbO$—$B_2O_3$—$SiO_2$ based, $PbO$—$ZnO$—$B_2O_3$ based acid component and metallic chloride. The low softening point glass material is preferably the so-called glass frit, which will melt in a curing step to be mentioned below. As for the low softening point glass material, powder having a median diameter in the range from 1 to 50 μm is preferably used. In order to improve the dispersibility and formability of the microparticles, solvents and organic solvents having high boiling point can be mixed to the low softening point glass material.

Sol-gel materials are a group of compounds which hydrolytic polycondensation proceeds and the material cures by action of heat, light, catalysts, or the like. For example, they may be metal alkoxide (metal alcoholate), a metal chelate compound, halogenated metal, fluid glass, a spin-on glass, or reactants thereof and catalysts may be included therein to accelerate curing. Those having photoreactive functional groups such as an acrylic group in a moiety of a metal alkoxide functional group may be also possible. These may be used alone or by combining multiple kinds, depending on the required physicality. A curing body of the sol-gel material refers to a state where the polymerization reaction of the sol-gel material has been sufficiently progressed. The sol-gel material chemically bonds and strongly adheres to the surface of an inorganic substrate in the course of a polymerization reaction. Accordingly, by using a curing body of the sol-gel material as a cured layer, a stable cured layer can be formed.

Metal alkoxides are a group of compounds obtainable from a reaction of any metallic species with water or organic solvents by hydrolysis catalysts, and are a group of compounds which any metallic species and functional groups such as a hydroxyl group, a methoxy group, an ethoxy group, a propyl group, an isopropyl group, or the like, are bonded. Metallic species of a metal alkoxide include silicon, titanium, aluminum, germanium, boron, zirconium, tungsten, sodium, potassium, lithium, magnesium, tin, or the like.

A metal alkoxide in which the metallic species is silicon includes, for example, dimethyldiethoxysilane, diphenyldiethoxysilane, phenyltriethoxysilane, methyltriethoxysilane (MTES), vinyltriethoxysilane, p-styryltriethoxysilane, methylphenyldiethoxysilane, 2-(3,4-epoxycyclohexyl)ethyltriethoxysilane, 3-glycidoxypropyltriethoxysilane, 3-glycidoxypropylmethyldiethoxysilane, 3-methacryloxypropylmethyl diethoxysilane, 3-methacryloxypropyltriethoxysilane, 3-acryloxypropyltriethoxysilane, N-2-(aminoethyl)-3-aminopropylmethyldiethoxysilane, N-2-(aminoethyl)-3-aminopropyltriethoxysilane, 3-aminopropyltriethoxysilane, 3-ureidopropyltriethoxysilane, 3-mercaptopropylmethyldiethoxysilane, 3-mercaptopropyltriethoxysilane, tetraethoxysilane (TEOS), diphenylsilanediol, dimethylsilanediol, or a group of compounds where the ethoxy groups of these group of compounds are substituted with a methoxy group, a propyl group, an isopropyl group, a hydroxyl group, or the like. Amongst these, TEOS and tetramethoxysilane (TMOS) in which the ethoxy group of TEOS is substituted with a methoxy group are especially preferable. These may be used alone or by combining multiple kinds.

When TEOS, MTES or a combination thereof is used, the mixing ratio thereof may be, for example, 1:1 in a molar ratio. This sol solution generates amorphous silica by performing hydrolysis and a polycondensation reaction. As a synthesis condition, acid such as hydrochloric acid or alkaline such as ammonium is added to adjust the pH of the solution. The pH is preferably 4 or less or 10 or more. Water may also be added to perform hydrolysis. The amount of water to be added can be more than 1.5 times or more in a molar ratio, based on the kind of metallic alkoxide.

A silsesquioxane compound may also be used for the metallic alkoxide. A silsesquioxane compound is a collective term for a group of compounds represented by $SiO_{1.5}$ and is a compound in which one organic base and three oxygen atoms are bound against one silicon atom. A metallic halide is a compound group having a functional group to be hydrolysed and polycondensed, replaced by a halogen atom in the above-described metal alkoxide.

A metallic chelate compound includes titanium diisopropoxy bis(acetylacetonate), titanium tetrakis acetylacetonate, titanium dibutoxy bis(octyleneglycolate), zirconium tetrakis acetylacetonate, zirconium dibutoxy bis(acetylacetonate), aluminum tris acetylacetonate, aluminium dibutoxy mono(acetylacetonate), zinc bis(acetylacetonate), indium tris(acetylacetonate), polytitanium acetylacetonate, or the like.

A highly transparent organic binder includes a resin, for example, a thermoplastic resin, an ionizing radiation-curable resin, a thermoset resin, an adhesive, and the like. The thermoplastic resin is may be any thermoplastic resin, provided that it dissolves easily in the solvent. As for such thermoplastic resin, for example, an acrylic resin, a polyester resin, a polyolefin resin, a vinyl resin, a polycarbonate resin, and a polystyrene resin can be used and methyl polymethacrylate resin, polyethylene terephthalate resin, a polyethylene naphthalate resin, a polypropylene resin, a cycloolefin resin, a cellulose acetate propionate resin, a polyvinyl butyral resin, a polycarbonate resin, an ethylene-vinyl acetate copolymer resin, a nitrocellulose resin, and a polystyrene resin can be used. As for these resins, one kind may be used alone or two or more kinds may be used in a combination. Examples of the ionizing radiation-curable resin include an acrylic resin, a urethane resin, an acrylic urethane resin, an epoxy resin, silicone resin, and the like. Among these, those having an acrylate functional group, for example, those containing a relatively large amount of a monofunctional monomer such as ethyl (meth)acrylate, ethylhexyl (meth)acrylate, styrene, methyl styrene, N-vinylpyrrolidone and a polyfunctional monomer, such as polymethylolpropane tri(meth)acrylate, hexane diol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexane diol di(meth)acrylate, neopentyl glycol di(meth)acrylate as an oligomer or a prepolymer of a polyester resin, a polyether resin, an acrylic resin, an epoxy resin, a urethane resin, an alkyd resin, a spiroacetal resin, a polybutadiene resin, a polythiol polyene resin, a (meth)acrylate of a polyfunctional compound such as a polyalcohol and a reactivity diluent having a relatively low molecular weight are preferable. The ionizing radiation-curable resin may also be obtained by mixing a thermoplastic resin and a solvent and may be one used for a hard coat layer to impart scratch resistance or an anti-glaring property. The ionizing radiation-curable resin includes a silicone resin, an epoxy resin, a urethane resin, an acrylic resin, or the like. The thermoset resin includes a phenolic resin, an epoxy resin, a silicone resin, a melamine resine, a urethane resin, a urea resin, or the like. Amongst these, an epoxy resin and a silicone resin are preferable. The polyvinyl butyral resin and the ethylene-vinyl acetate copolymer resin from the thermoplastic resins have an excellent adherence property to substrates such as glass, metals, ceramics, or the like, and they may be used as an adhesive. A commercially available product may be used for the organic binder, including for example, an acryl lacquer (RECRACK 73 Clear, manufactured by FUJIKURA KASEI CO., LTD.), an urethane acrylate type UV curable resin (UNIDIC V-4018 manufactured by DIC Company), and product name EA-415 manufactured by SANYU REC. LTD., and the like.

The use of an organic binder as an adhesive will allow imparting an adherence property to the cured film from the dispersion liquid. Examples of the adhesive include a natural rubber, a synthetic rubber, an acryl resin, a polyvinyl ether resin, a urethane resin, and a silicone resin. Specific examples of the synthetic rubber include a styrene-butadiene rubber, an acrylonitrile-butadiene rubber, a polyisobutylene rubber, an isobutylene-isoprene rubber, a styrene-isoprene block copolymer, a styrene-butadiene block copolymer, and a styrene-ethylene-butylene block copolymer. Specific examples of the silicone resin include a dimethyl polysiloxane. As for these adhesives, one kind of can be used alone or two or more kinds can be used in combination. Among these, an acrylic adhesive is preferable.

An acrylic resin adhesive includes at least an alkyl ester (meth)acrylate monomer and is formed by polymerization. Copolymerization of an alkyl ester (meth)acrylate monomer having an alkyl group having 1 to about 18 carbon atoms and a monomer having a carboxyl group is common. A (meth) acrylic acid means an acrylic acid and/or a methacrylic acid. Examples of the alkyl ester (meth)acrylate monomer include methyl (meth)acrylate, ethyl (meth)acrylate, n-propyl (meth)acrylate, sec-propyl (meth)acrylate, n-butyl (meth) acrylate, sec-butyl (meth)acrylate, tert-butyl (meth)acrylate, isoamyl (meth)acrylate, n-hexyl (meth)acrylate, cyclohexyl (meth)acrylate, n-octyl (meth)acrylate, isooctyl (meth)acrylate, 2-ethylhexyl (meth)acrylate, undecyl (meth)acrylate, and lauryl (meth)acrylate. The above-described alkyl ester (meth)acrylate is usually copolymerized at a ratio of 30 to 99.5 parts by mass in the acrylic adhesive.

The monomer having a carboxyl group, which forms the acrylic resin adhesive, are the monomers containing a carboxyl group such as (meth)acrylate, itaconic acid, crotonic acid, maleic acid, monobutyl maleate, and β-carboxyethyl acrylate.

Monomers having other functional groups may be copolymerized in the acrylic resin adhesive, apart from the ones described above, as long as it does not impart the property of the acrylic resin adhesive. Examples of the monomers having other functional groups include monomers containing a hydroxyl group such as 2-hydroxyethyl (meth)acrylate, 2-hydroxypropyl (meth)acrylate, and aryl alcohol; monomers containing an amide group such as (meth)acryl amide, N-methyl(meth)acryl amide, and N-ethyl(meth)acryl amide; monomers containing an amide group such as N-methylol (meth)acryl amide and dimethylol (meth)acryl amide and a methylol group; monomers having a functional group such as monomers containing amino methyl(meth)acrylate, dimethyl amino methyl(meth)acrylate, and vinyl pyridine; monomers containing an epoxy group such as allyl glycidyl ether, glycidyl ether(meth)acrylate; and the like. Apart from these, there can be included, fluorine-substituted alkyl ester (meth) acrylate, (meth) acrylonitrile and others like aromatic compound containing a vinyl group such as styrene and methyl styrene, vinyl acetate, a halogenated vinyl compound, and the like.

As for the acrylic resin adhesive, other monomers having ethylenic double bonds may be used other than the above-described monomers having other functional groups. Examples of the monomers having ethylenic double bonds include a diester of an α,β-unsaturated dibasic acid such as dibutyl maleate, dioctyl maleate, and dibutyl fumarate; a vinyl ester such as vinyl acetate, vinyl propionate; vinyl ether; a vinyl aromatic compound such as styrene, α-methyl styrene, and vinyl toluene; and (meth)acrylonitrile. Other than the monomers having ethylenic double bonds as described above, a compound having two or more ethylenic double bonds may be used in combination. Examples of such a compound include divinylbenzene, diallyl maleate, diallyl phthalate, ethylene glycol di(meth)acrylate, trimethylol propane tri(meth)acrylate, and methylene bis(meth) acrylamide.

Commercially available products may be used as the adhesive, and for example, SK-Dyne 2094, SK-Dyne 2147, SK-Dyne 1811L, SK-Dyne 1442, SK-Dyne 1435, and SK-Dyne 1415 (all manufactured by Soken Chemical & Engineeing Co., Ltd.), ORIBAIN EG-655 and ORIBAIN BPS5896 (both manufactured by TOYO INK CO., LTD.), and the like (all, product name) can be suitably used.

(Bright Flake-Form Microparticles)

As for the bright flake-form microparticles, a bright material processable to a flake-form can be suitably used. Regular reflectance of the bright flake-form microparticles is preferably 12.0% or higher, more preferably from 15.0% to 100%, further preferably from 20.0% to 95%. In the present invention, the regular reflectance of the bright flake-form microparticles is the value measured in such way as follows.

(Regular Reflectance)

The regular reflectance is measured by using a spectrophotometer (Part No.: CM-3500d; manufactured by KONICA MINOLTA INC.). The bright flake-form microparticles dispersed in an appropriate solvent (water or methyl ethyl ketone) is coated on a glass slide such that the film thickness will be 0.5 mm or more and then dried. The regular reflectance was measured for this obtained glass plate with the coated film when light entered from the glass surface to the coated film at an angle of 45 degrees with respect to the normal line of the glass surface. By measuring the regular reflectance of the case where the bright flake-form microparticles are used as the coated film, the reflective performance of the bright flake-form microparticles can be figured out, taking into consideration of the oxidized state of the surface of the microparticles, or the like.

As for the bright flake-form microparticles, for example, metallic microparticles such as aluminum, silver, copper, platinum, gold, titanium, nickel, tin, tin-cobalt alloy, indium, and chromium, or metallic microparticles consisting of aluminum oxide and zinc sulfide, a bright material of a glass coated with metal or metal oxide, or a bright material of natural or synthetic mica coated with metal or metal oxide can be used, depending on the kind of binder to be dispersed in.

Metals having excellent reflectiveness of the projection light are used for metal materials of the metallic microparticles. In particular, the metal materials have reflectance R in measured wavelength of 550 nm of preferably 50% or higher, more preferably 55% or higher, further preferably 60% or higher, still more preferably 70% or higher. In the following, "reflectance R" in the present invention refers to a reflectance when light entered from the vertical direction with respect to the metallic material. Reflectance R can be calculated from the following formula (1), using values of refractive index n and extinction value k which are characteristic values of the metal material. n and k are described in, for example, Handbook of Optical Constants of Solids: Volume 1 (authored by Edward D. Palik) and P. B. Johnson and R. W Christy, PHYSICAL REVIEW B, Vol. 6, No. 12, 4370-4379 (1972).

$$R=\{(1-n)^2+k^2\}/\{(1+n)^2+k^2\} \quad \text{formula (1)}$$

That is to say, reflectance R (550) in measured wavelength of 550 nm can be calculated from n and k measured at wavelength of 550 nm. The metal material has an absolute value of difference between reflectance R (450) in measured wavelength of 450 nm and reflectance R (650) in wavelength of 650 nm within 25%, preferably within 20%, more preferably within 15%, further preferably within 10% based on reflectance R (550) in measured wavelength 550 nm. The use of such reflection type transparent screen using such metal material will provide excellent reflectiveness and color reproducibility of the projection light and excellent performance as a screen.

The metal material used for the metallic microparticles have a real number term ε' of an electric permittivity preferably from −60 to 0 and more preferably from −50 to −10. The real number term ε' of the electric permittivity can be calculated from the following formula (2) using values of the refractive index n and the extinction index k.

$$\varepsilon'=n^2-k^2 \quad \text{formula (2)}$$

The present invention is not restricted by any theory. However, the real number term ε' of the electric permittivity for the metal material, satisfying the above numerical range, will generate the following action and it is considered that the transparent light scattering body can be used suitably as a reflection type transparent screen. That is to say, when light enters into the metallic microparticles, an oscillating electric field is generated by light in the metallic microparticles; however, at the same time, a reversed electrical polarization is generated by free electrons, blocking the electric field. When presuming an ideal state that when the real number term ε' of electric permittivity is 0 or less, light is completely blocked and light cannot enter into the metallic microparticles, i.e., there are no dispersion by a concavoconvex surface and no light absorbance by metallic microparticles, it will mean that light is reflected totally at the surface of the metallic microparticles, and therefore, the reflectiveness of light will be strong. When ε' is 0 or higher, oscillation of the free electrons of the metallic microparticles cannot follow oscillation of light, thus, the oscillating electric field by light cannot be completely denied and light will enter into or transmit through the metallic microparticles. As a result, only a portion of light is reflected at the surface of the metallicaparticles and the reflectiveness of light will become low.

As for the metal material, those using a metal material satisfying the above-described reflectance R and preferably, in addition, the electric permittivity may be used, and also pure metal and alloy can be used. The pure metal is preferably selected from the group consisting of aluminum, silver, platinum, titanium, nickel, and chromium. As for the metallic microparticles, microparticles consisting of those metal materials and microparticles made by coating those metal materials to a resin, a glass, natural or synthetic mica, or the like, can be used. The shape of the metallic microparticles is not particularly limited and bright flake-form microparticles or substantially spherical microparticles can be used. The refractive index n and the extinction index k in each measured wavelength are summarized in Table 1 with respect to various kinds of the metal materials and the reflectance R and ε' calculated from such values are summarized in Table 2.

TABLE 1

| Metal | Refractive index n | | | Extinction index k | | |
|---|---|---|---|---|---|---|
| material | n(450) | n(550) | n(650) | k(450) | k(550) | k(650) |
| Aluminum | 0.62 | 0.96 | 1.49 | 5.48 | 6.70 | 7.82 |
| Silver | 0.15 | 0.12 | 0.14 | 2.48 | 3.35 | 4.15 |
| Platinum | 1.85 | 2.13 | 2.38 | 3.15 | 3.72 | 4.25 |
| Titanium | 1.70 | 1.89 | 2.22 | 2.27 | 2.62 | 2.99 |
| Nickel | 1.64 | 1.77 | 2.02 | 2.66 | 3.26 | 3.82 |
| Chromium | 2.34 | 3.17 | 3.10 | 3.14 | 3.33 | 3.33 |
| Copper | 1.17 | 0.95 | 0.21 | 2.40 | 2.58 | 3.67 |
| Gold | 1.50 | 0.35 | 0.17 | 1.88 | 2.73 | 3.15 |

TABLE 2

| Metal | Reflectance R | | | \|R(450) − R(650)\|/ R(550) × 100 | the real number term ε' of the electric permittivity | | |
|---|---|---|---|---|---|---|---|
| material | R(450) | R(550) | R(650) | [%] | ε'(450) | ε'(550) | ε'(650) |
| Aluminum | 0.92 | 0.92 | 0.91 | 1.1 | −29.65 | −43.96 | −58.93 |
| Silver | 0.92 | 0.96 | 0.97 | 5.2 | −6.12 | −11.19 | −17.20 |
| Platinum | 0.59 | 0.64 | 0.68 | 14.1 | −6.54 | −9.31 | −12.41 |

TABLE 2-continued

| Metal material | Reflectance R | | | \|R(450) − R(650)\|/ R(550) × 100 [%] | the real number term ε' of the electric permittivity | | |
|---|---|---|---|---|---|---|---|
| | R(450) | R(550) | R(650) | | ε'(450) | ε'(550) | ε'(650) |
| Titanium | 0.45 | 0.50 | 0.54 | 18.0 | −2.28 | −3.27 | −4.01 |
| Nickel | 0.53 | 0.61 | 0.66 | 21.3 | −4.40 | −7.47 | −10.51 |
| Chromium | 0.55 | 0.55 | 0.56 | 1.8 | −4.41 | −1.04 | −1.48 |
| Copper | 0.55 | 0.64 | 0.94 | 60.9 | −4.39 | −5.74 | −13.42 |
| Gold | 0.39 | 0.85 | 0.94 | 64.7 | −1.26 | −7.34 | −9.89 |

The primary particles of the bright flake-form microparticles have an average diameter of preferably from 0.01 to 100 μm, more preferably from 0.05 to 80 μm, further preferably from 0.1 to 50 μm, still more preferably from 0.5 to 30 μm. In addition, the average aspect ratio (=the average diameter/the average thickness of the bright flake-form microparticles) of the bright flake-form microparticles is preferably from 3 to 800, more preferably from 4 to 700, further preferably from 5 to 600, still more preferably from 10 to 500. When the average diameter and the average aspect ratio of the bright flake-form microparticles are within the above range, a sufficient scattering effect of the projection light can be obtained without compromising the transmission visibility and thus, a clear video image can be projected on the transparent screen. In the present invention, the average diameter of the bright flake-form microparticles is measured using a laser diffraction particle size distribution measurement apparatus (Part No.: SALD-2300; manufactured by Shimadzu Corporation). The average aspect ratio was calculated from an SEM (Trade Name: SU-1500; manufactured by Hitachi High Technologies Corporation) image.

Commercially available bright flake-form microparticles can be used, and for example, aluminum powder manufactured by Daiwa Kinzoku Kogyo Co., Ltd., and product name METASHINE manufactured by Matsuo Sangyo Co., Ltd. can be suitable for use.

The content of the bright flake-form microparticles in the dispersion liquid can be appropriately adjusted, depending on the regular reflectance of the bright flake-form microparticles. The content of the bright flake-form microparticles in the dispersion liquid is preferably from 0.0001 to 10.0% by mass, preferably from 0.0005 to 8.0% by mass, more preferably from 0.001 to 5.0% by mass, based on the binder. When a transparent light scattering layer is formed by dispersing the bright flake-form microparticles in the binder in a low concentration as like the above-described range, the projection light emitting from a light source is anisotropically scattered and reflected, which makes it possible to improve the visibility of the projection light and the transmission light.

(Substantially Spherical Microparticles)

The substantially spherical microparticles may include completely spherical particles and spherical particles having concavity and convexity or protrusions. As for the substantially spherical microparticles having a high refractive index, use can be made to metallic particles obtained from atomizing inorganics, metallic oxides, or metallic salts, preferably having a refractive index from 1.80 to 3.55, more preferably from 1.9 to 3.3, further more preferably from 2.0 to 3.0. The inorganics include, for example, diamond=2.40), cerium oxide (n=2.20), or the like. The metallic salts (n=2.42). The metallic oxides include, for example, zirconium oxide (n include, for example, barium titanate (n=2.40), strontium titanate (n=2.37), or the like. The substantially spherical microparticles having a low refractive index include, for example, inorganic particles obtained by atomizing magnesium oxide (n=1.74), barium sulfate (n=1.64), calcium carbonate (n=1.65), silica (silicon oxide, n=1.45), or the like, which preferably have a refractive index from 1.35 to 1.80, more preferably from 1.4 to 1.75, further preferably from 1.45 to 1.7. Further, organic substantially spherical microparticles having a low refractive index include, for example, cross-linked acrylic resin particles, cross-linked styrene resin particles, or the like. As for these substantially spherical microparticles, one kind can be used alone or two or more kinds can be used in combination.

The median diameter for the primary particles of the substantially spherical microparticles are preferably from 0.1 to 500 nm, more preferably from 0.2 to 300 nm, further preferably from 0.5 to 200 nm. When the median diameter for the primary particles of the substantially spherical microparticles is within the above range, a sufficient diffusion effect of the projection light can be obtained without compromising the transmission visibility, and thus, a clear video image can be projected on the transparent screen. In the present invention, the median diameter ($D_{50}$) for the primary particles of the inorganic microparticles can be determined from a particle size distribution measured using a particle size distribution measurement apparatus (manufactured by Otsuka Electronics Co., Ltd., product name: DLS-8000) by a dynamic light scattering method.

The content of the substantially spherical microparticles in the dispersion liquid can be appropriately adjusted, depending on the thickness of the transparent light scattering layer and the refractive index of the microparticles. The content of the substantially spherical microparticles in the dispersion liquid is preferably from 0.0001 to 20.0% by mass, more preferably from 0.001 to 10.0% by mass, further preferably from 0.005 to 5.0% by mass, still more preferably from 0.01 to 3.0% by mass, based on the binder. When a transparent light scattering layer is formed by dispersing the substantially spherical microparticles in the binder in about the above-described range, the projection light emitting from a projection device is anisotropically scattered while ensuring the transparency of the transparent light scattering layer, which makes it possible to satisfy both the visibility of the diffused light and the transmission light.

(Solvent)

The dispersion liquid according to the present invention may further contain a solvent. Viscosity of the dispersion liquid can be appropriately adjusted by including a solvent in the dispersion liquid. The solvent is not limited to organic solvents and solvents used in general coating compositions can be used. For example, a hydrophilic solvate, represented by water, can also be used. When the binder of the present invention is a liquid, a solvent does not have to be contained.

Specific examples of the solvent according to the present invention include, for example, alcohols such as methanol, ethonaol, isopropyl alcohol (IPA), n-propanol, butanol, 2-butanol, ethylene glycol, and propylene glycol; aliphatic carbon hydrides such as hexane, heptane, octane, decane, and cyclohexane; aromatic carbon hydrides such as benzene, toluene, xylene, mesitylene, and tetramethylbenzene; ethers such as diethylether, tetrahydrofuran, and dioxane; ketones such as acetone, methyl ethyl ketone, isophorone, cyclohexanone, cyclopentanone, and N-methyl-2-pyrrolidone; ether alcohols such as butoxyethyl ether, hexyloxy ethyl alcohol, methoxy-2-propanol, and benzyloxy ethanol; glycols such as ethylene glycol and propylene glycol; glycol ethers such as ethylene glycol dimethylether, diethylene glycol dimethyl ether, propylene glycol monomethyl ether acetate, cellosolve, methyl cellosolve, ethyl cellosolve, carbitol, methyl carbitol, ethyl carbitol, butyl carbitol, propylene glycol monomethyl ether, propylene glycol monoethyl ether, dipropylene glycol monomethyl ether, dipropylene glycol monoethyl ether, triethylene glycol monomethyl ether, and triethylene glycol monoethyl ether; esters such as ethyl acetate, butyl acetate, ethyl lactate, and γ-butylolactone; phenols such as phenol and chlorophenol; amides such as N,N-dimethyl formamide, N,N-dimethyl acetamide, and N-methylpyrrolidone; halogenated solvates such as chloroform, methylene chloride, tetrachloroethane, monochlorobenzene, and dichlorobenzene; hetero element containing compounds such as carbon bisulfide; water; and mixed solvates thereof. The amount of solvates to be added can be appropriately adjusted, depending on, for example, the kind of binders or microparticles, or the viscosity range suitable for the coating or spraying steps to be discussed below.

As long as the transmission visibility of the transparent light scattering layer and the desired optical performance are not impaired, conventionally known additives may be added to the dispersion liquid, depending on applications, other than the microparticles. Examples of the additives include an antioxidant, a surfactant, a thickener, a compatibilzer, a nucleating agent, an ultraviolet absorber, a light stabilizer, an antistatic agent, a release agent, a flame retardant, a plasticizer, a lubricant, a color material, and the like. As for the color material, a pigment or dye such as carbon black, azo pigment, anthraquinone pigment, or perinone pigment can be used. A liquid crystalline compound or the like may be mixed thereto.

<Cured Film>

The cured film according to the present invention is a transparent film obtained by curing the dispersion liquid in which at least either one of the bright flake-form microparticles or the substantially spherical microparticles are dispersed in the binder; and when the dispersion liquid comprises a solvent, the cured film is obtained by removing the solvent from the dispersion liquid and curing the dispersion liquid. As used herein, curing according to the present invention includes not only a polymerization reaction of the monomers and a reaction generating hardness by a cross-link reaction among the polymers by, for example, a curing agent and heat, and electron beam irradiation, but also a reaction imparting hardness to the binder upon removal of the solvent from the binder by, for example, heat/calcination.

The cured film according to the present invention may have an adherence property. The cured film with an adherence property will allow adhesion to the other layers of the transparent screen, such as a substrate layer or a supporting layer, even without installing an alternative adhesion layer, or the like.

The haze value of the cured film when the cured film is made in a thickness of 2 μm by curing the dispersion liquid, is preferably 30% or less, more preferably from 0 to 20%, further preferably from 0 to 10%. Using the dispersion liquid which is capable of making such cured film, a transparent light scattering layer can be formed, capable of producing a clearer image while having transparency.

The thickness of the cured film is, without particular limitation, preferably from 0.01 μm to 1 mm, more preferably from 0.1 μm to 500 μm, further preferably from 1 μm to 300 μm. When the cured film is within the above-described range, the transparent light scattering layer can fully exhibit its function. The cured film may be a monolayer configuration or may be a multiple-layer configuration made by layering two or more layers by, for example, coating.

The cured film preferably have a scratch hardness of HB or more, more preferably H or more, measured in accordance with JIS-K5600-5-4 (a scratch hardness method), and further preferably, the cured film has a scratch resistance of 2H or more.

(Transparent Light Scattering Layer)

The transparent light scattering layer is consisted of the above-described cured film of the dispersion liquid. Use efficacy of the light can be improved in the transparent light scattering layer by anisotropically scattering and reflecting the light. The haze value of the above-described cured film of the dispersion liquid is preferably 50% or less, more preferably from 1% to 40%, further preferably from 1.3% to 30%, still more preferably from 1.5% to 20%. When the haze value of the cured film is within the above-described range, the transparent light scattering layer consisted of the cured film can produce a clearer image while having transparency.

The above-described cured film of the dispersion liquid has a thickness of t (μm) and a concentration c (% by mass) of the above-described bright flake-form microparticles and/or the above-described substantially spherical microparticles based on above-described binder, which t and c preferably satisfy the following formula (I):

$$0.05 \leq (t \times c) \leq 50 \quad (I),$$

more preferably the following formula (I-2):

$$0.1 \leq (t \times c) \leq 40 \quad (I\text{-}2),$$

further preferably the following formula (I-3):

$$0.15 \leq (t \times c) \leq 35 \quad (I\text{-}3),$$

still more preferably the following formula (I-4):

$$0.3 \leq (t \times c) \leq 30 \quad (I\text{-}4).$$

When t and c of the cured film satisfy the above-described formula (I), the rate of the light straightly transmitted increases (the rate of the light which does not collide with the microparticles increases) since the microparticles in the binder of the transparent light scattering layer of the screen are in a sparsy dispersed state (the content of the microparticles in the binder is low), and as a result, a clear image can be displayed on the screen without impairing the visibility of the transmission light. When two kinds or more of the bright flake-form microparticles and/or the substantially spherical microparticles are included, concentration c is the total concentration of all the microparticles.

The transparent light scattering layer can be formed by coating and curing the above-described dispersion liquid on the substrate. The transparent light scattering layer formed by such procedure improves the dispersibility of the microparticles and in turn, the microparticles are unlikely to form into a big aggregate, which becomes a foreign substance. As a result, a screen having a higher transparency and a high quality can be obtained.

The number of foreign substances in the transparent light scattering layer is preferably from 0 to 20, more preferably from 0 to 10, especially preferably from 0 to 5. The foreign substances impart clarity of the image, however, when the number of foreign substances is within the above-described range, a projected image can be visible as a clear image without distortion or a bright spot. In the present invention, the number of foreign substances in the transparent light scattering layer is the number counted by the following measuring method.

(Measuring Method for Foreign Substances)

The number of foreign substances is determined by counting a visually identifiable large aggregate (a foreign substance) from a 20 cm squares-cut transparent light scattering layer.

<Transparent Screen>

The transparent screen according to the present invention comprises the above-described transparent light scattering layer consisted of the cured film of the dispersion liquid. The transparent screen may be of a monolayer configuration composed of only the transparent light scattering layer, or may be a layered body of a multiple layer configuration, further comprising other layers such as a protection layer, a backing layer, an adhesive layer, and a reflection protection layer. The transparent screen may comprise a support such as a glass, a transparent partition, or the like. The transparent screen can satisfy both the visibility of the projection light and the transmission light by anisotropically scattering and reflecting the projection light emitting from a light source. The transparent screen can be suitably used for a glass window, a head-up display, a wearable display, or the like. In addition, the transparent screen according to the present invention can be suitably used for a member for a vehicle or a member for a building.

A cross-sectional view in the thickness direction of one embodiment of the transparent screen according to the present invention is shown in FIG. 1. The transparent screen comprises a transparent light scattering layer 13 in which bright flake-form microparticle 11 and substantially spherical microparticle 12 are dispersed in a binder 10. Such transparent screen anisotropically scatters a projection light 15, whereby a viewer 14 can visualize a scattering light 16.

The transparent screen may be a rear projection screen (a transmission type screen) or may be a front projection screen (a reflection type screen). That is, in a video image display device comprising the transparent screen according to the present invention, a projection device (a light source) may be positioned on the observer side with respect to the screen or may be positioned on the opposite side of the observer. The transparent screen may have a plane surface or a curved surface.

The haze value of the transparent screen is preferably 50% or less, more preferably from 1% to 40%, more preferably from 1.3% to 30%, and still more preferably from 1.5% to 20%. Total light transmittance is preferably 70% or higher, more preferably 75% or higher, further preferably 80% or higher, and still more preferably 85% or higher. Further, diffusion transmittance of the transparent screen is preferably from 1.5% to 60%, more preferably from 1.7% to 55%, more preferably from 1.9% to 50%, still more preferably from 2.0% to 45%. When the haze value and the total light transmittance is within the above-described ranges, the transparency is high and the transmission visibility can be further improved, and when the diffusion transmittance is within the above-described range, the entered light can be diffused efficiently and the viewing angle can be more improved. Therefore, the screen performance becomes excellent. In the present invention, the haze value, the total light transmittance, and the diffusion transmittance of a transparent screen can be measured using a haze meter (manufactured by NIPPON DENSHOKU INDUSTRIES CO., LTD., trade name: NDH-5000) in accordance with JIS-K-7361 and JIS-K-7136.

The image clarity of the transparent screen is preferably 70% or higher, more preferably 75% or higher, further preferably 80% or higher, still more preferably 85% or higher, and especially preferably 90% or higher. When the image clarity of the transparent screen is within the above-described range, an image appeared through such a transparent screen becomes extremely clear. In the present invention, the image clarity is a value of definition (%) when measured with an optical comb having a width of 0.125 mm in accordance with JIS K7374.

(Substrate)

A substrate is a support for forming the transparent light scattering layer into a cured film form. As for the substrate, a substrate consisted of inorganic materials such as a metal, ceramics, a soda glass, a quartz glass, a sapphire substrate, quartz, a float plate glass, a silicon substrate, and resin substrates such as polyethylene terephthalate (PET), polyethylene terenaphthalate (PEN), a polycarbonate (PC), a cycloolefin polymer (COP), polymethyl meth(acrylate) (PMMA), polystyrene (PS), polyimide (PI), polyaryate may be used. The substrate is, for example, especially preferably an optically transparent substrate in the optical wavelength range from 400 nm to 780 nm, since it may be used in various optical applications other than a screen. When use is made in an ultraviolet wavelength range, preferably, a substrate is used comprising quartz or a sapphire glass which has a high transmission of an ultraviolet ray. Surface treatment may be performed or a simplified adhesion layer may be arranged on the substrate, in order to improve the adherence property, and a gas barrier layer can also be arranged on the substrate to prevent entries of moisture and gaseous matter such as oxygen. When the curing reaction comprises a high-temperature step such as sintering, a material that will not be softened or damaged by the high-temperature is preferably used. The thickness of the substrate can be appropriately changed such that its strength becomes suitable, depending on the purpose/the material. The thickness of the substrate may be, for example, in the range from 10 μm to 1 mm (1000 μm), and the substrate may be a thick board of 1 mm or more.

(Protection Layer)

A protection layer is layered on the front side (observer side) of the transparent screen, and is a layer for imparting a function such as a light resistance, a scratch resistance, and a stain resistance. The protection layer is preferably formed by using a resin which does not compromise the transmission visibility or the desired optical property of the transparent screen. For such a resin, for example, a resin cured by an ultraviolet ray or electron ray, i.e., an ionizing radiation-curable resin, a mixture obtained by adding a thermoplastic resin and a solvent to an ionizing radiation-curable resin, and a thermoset resin may be used. Among these, an ionizing radiation-curable resin is particularly preferable.

For a film forming component of the ionizing radiation-curable resin composition, preferably, those having an acrylate functional group, for example, those containing a relatively large amount of a monofunctional monomer such as ethyl (meth)acrylate, ethylhexyl (meth)acrylate, styrene, methyl styrene, N-vinylpyrrolidone and a polyfunctional monomer, such as polymethylolpropane tri(meth)acrylate, hexane diol (meth)acrylate, tripropylene glycol di(meth)

acrylate, diethylene glycol di(meth)acrylate, pentaerythritol tri(meth)acrylate, dipentaerythritol hexa(meth)acrylate, 1,6-hexane diol di(meth)acrylate, neopentyl glycol di(meth) acrylate as an oligomer or a prepolymer of a polyester resin, a polyether resin, an acrylic resin, an epoxy resin, a urethane resin, an alkyd resin, a spiroacetal resin, a polybutadiene resin, a polythiol polyene resin, a (meth)acrylate of a polyfunctional compound such as a polyalcohol and a reactivity diluent having a relatively low molecular weight can be used.

In order to make the above-described ionizing radiation-curable resin composition an ultraviolet light-curable resin composition, acetophenones, benzophenons, Michler's benzoyl benzoates, α-amidoxime esters, tetramethyl thiuram monosulfides, and thioxanthones as photopolymerization initiators, and n-butyl amine, triethylamine, and poly-n-butylphosphine as photosensitizers may be added thereto to be used. Particularly, in the present invention, for example, urethane acrylate as an oligomer and dipentaerythritol hexa (meth)acrylate as a monomer are preferably mixed.

The above-described ionizing radiation-curable resin composition can be cured by means of a common curing process, i.e., by irradiation of an electron ray or an ultraviolet ray. For example, when curing with an electron ray, use can be made to an electron ray having an energy from 50 to 1000 KeV, preferably from 100 to 300 KeV, released from various types of electron beam accelerators such as a Cockcroft-Walton type, a Van de Graaff type, a resonance transforming type, an insulating core transforming type, a linear type, a dynamitron type, a high frequency wave type; and when curing with an ultraviolet ray, use can be made to an ultraviolet ray generated from rays such as an ultrahigh pressure mercury lamp, a low-pressure mercury lamp, a carbon-arc, a xenon-arc, or a metal halide lamp.

The protection layer can be formed by apply a coating liquid of the above-described ionizing radiation (ultraviolet ray)-curable resin composition on the surface of the above-described transparent light scattering layer by a method such as spin coating, die coating, dip coating, bar coating, flow coating, roll coating, or gravure coating, and by curing the coating liquid by means as like the above. To the surface of the protection layer, a microstructure such as a concavoconvex structure, a prism structure, or a microlens structure can also be provided depending on the purposes.

(Reflection Protection Layer)

A reflection protection layer is a layer for preventing a reflection or a reflection of external light on the outermost surface of the transparent screen. The reflection protection layer may be layered on the front side (the observer side) of a transparent screen or may be layered on both sides thereof. Especially, when such a film is used as the transparent screen, the reflection protection layer is preferably layered on the observer side. The reflection protection layer is preferably formed by using a resin which does not compromise the transmission visibility or the desired optical property of the transparent screen. For such a resin, for example, a resin cured by an ultraviolet ray/an electron ray, i.e., an ionizing radiation-curable resin, those obtained by adding a thermoplastic resin and a solvent to an ionizing radiation-curable resin, and a themoset resin can be used. Among these, an ionizing radiation-curable resin is particularly preferable. To the surface of the reflection protection layer, a microstructure such as a concavoconvex structure, a prism structure, or a microlens structure can be provided depending on the purposes.

A method for forming the reflection protection layer is not particularly limited, and a dry coating method such as pasting of a coating film, or direct deposition or sputtering on a film substrate; and a wet coating treatment method such as gravure coating, microgravure coating, bar coating, slide die coating, slot die coating, and dip coating can be used.

<Method for Manufacturing Transparent Screen>

A method for manufacturing the transparent screen according to the present invention comprises a step of forming the transparent light scattering layer consisted of the cured film obtained by coating and curing the above-stated dispersion liquid on the substrate, wherein the curing is preferably performed upon removal of the solvent in the dispersion liquid. The method for manufacturing the transparent screen according to the present invention may also comprise a step of further layering other layers such as a protection layer, a backing layer, an adhesive layer, and a reflection protection layer.

The method for coating the dispersion liquid includes, without particular limitation, for example, a coating method such as roll coating, die coating, air knife coating, blade coating, spin coating, reverse coating, or gravure coating, and a coating method by spraying using an air spray apparatus, an ink-jet device, or an ultrasonic atomizing device, or a printing method such as gravure printing, screen printing, off-set printing, or ink-jet printing.

In order to improve the coating property, a solvent may be appropriately added to the dispersion liquid. Examples of the solvent include alcohols such as methanol, ethanol, n-propanol, isopropanol, ethylene glycol, and propylene glycol; ketones such as acetone, methyl ethyl ketone, cyclohexanone, cyclopentanone, and N-methyl-2-pyrrolidone; aromatic carbon hydrides such as toluene, xylene, and tetramethylbenzene; glycol ethers such as cellosolve, methyl cellosolve, ethyl cellosolve, carbitol, methyl carbitol, ethyl carbitol, butyl carbitol, propylene glycol monomethyl ether, propylene glycol monoethyl ether, dipropylene glycol monomethyl ether, dipropylene glycol monoethyl ether, triethylene glycol monomethyl ether, and triethylene glycol monoethyl ether; ethyl acetates such as ethyl acetate, butyl acetate, cellosolve acetate, ethyl cellosolve acetate, butyl cellosolve acetate, carbitol acetate, ethyl carbitol acetate, butyl carbitol acetate, propylene glycol monomethyl ether acetate, propylene glycol monoethyl ether acetate, and 3-methoxybutyl acetate; and others such as organic solvents, for example, methylene chloride, chloroform, chlorobenzene, dichlorobenzene tetrahydrofuran, N,N-dimethylformamide, N,N-dimethylacetamide, or the like. The amount of solvent to be added can be appropriately adjusted, depending on the types of the binder and the microparticles, the desired viscosity range, and the like.

<Member for Vehicle>

A member for a vehicle according to the present invention comprises the transparent screen as described above. Examples of the member for a vehicle include a windshield, i.e., a front glass, a rear glass, a front bench glass, a front door glass, a rear door glass, a front quarter glass, a rear bench glass, and a sliding roof, and the like. When the member for a vehicle comprises the transparent screen described above, a clear image can be displayed on the member for a vehicle without providing an alternative screen.

<Member for Building>

A member for a building according to the present invention comprises the transparent screen described above. Examples of the member for a building include a window glass for a house, a glass wall for a convenient store or a shop along the street, and the like. When the member for a building comprises the transparent screen described above, a clear image can be displayed on the member for a building without providing an alternative screen.

<Video Image Projection System>

A video image projection system according to the present invention comprises the transparent screen described above and a projection device. In the image display device, the projection device (a light source) can be positioned on the viewer side or opposite side of the viewer against the screen. The kind of projection device is not particularly limited, as long as it is capable of projecting an image on the screen, and for example, a commercially available rear projector or a front projector can be used.

Figure 2:
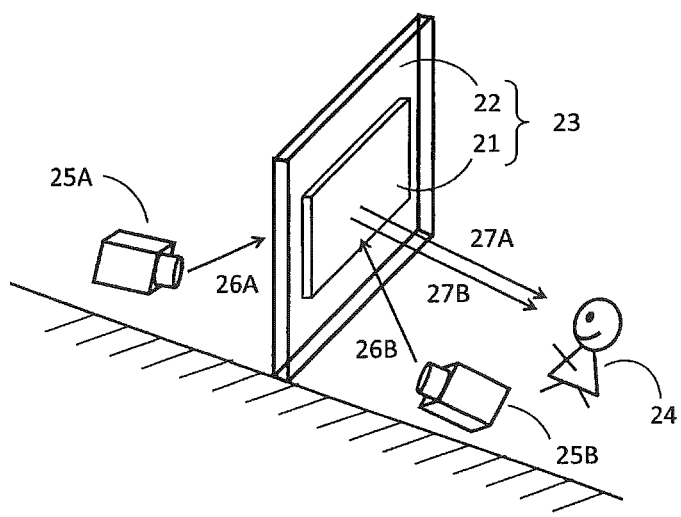
FIG. 2 is a schematic diagram illustrating one embodiment of a video image projection system according to the present invention.

A schematic diagram illustrating one embodiment of the transparent screen and the video image projection system according to the present invention is shown in FIG. 2. A transparent screen 23 comprises a transparent partition (a support) 22 and a transparent light scattering layer 21 on the viewer 24 side on the transparent partition 22. In order to adhere the transparent light scattering layer 21 to the transparent partition 22, the transparent screen 23 may comprise an adhesion layer between the two. When the screen is a transmission type screen, the video image projection system comprises the transparent screen 23 and a projection device 25A provided on the opposite side (rear side) of the observer 24 with respect to the transparent partition 22. Projection light 26A emitted from the projection device 25A enters from the rear side of the transparent screen 23 and anisotropically diffuses the light by the transparent screen 23, whereby the observer 24 can visually recognize a scattering light 27A. When the screen is a reflection type screen, the video image projection system comprises the transparent screen 23 and a projection device 25B provided on the same side (front side) of the observer 24 with respect to the transparent partition 22. Projection light 25B emitted from the projection device 25B enters from the front side of the transparent screen 23 and anisotropically diffuses the light by the transparent screen 23, whereby the observer 24 can visually recognize a scattering light 27B.

EXAMPLES

In the following, the present invention will be more specifically described with reference to Examples and Comparative Examples, but the present invention should not be construed to be limited to the following Examples.

The measuring methods of various physicalities and performance evaluation in the Examples and the Comparative Examples are as follows.

(1) Haze

Haze was measured by using a turbidimeter (Part No.: NDH-5000; manufactured by NIPPON DENSHOKU INDUSTRIES CO., LTD.) in accordance with JIS K 7136.

(2) Total Light Transmittance

Total light transmittance was measured by using a turbidimeter (Part No.: NDH-5000; manufactured by NIPPON DENSHOKU INDUSTRIES CO., LTD.) in accordance with JIS K 7361-1.

(3) Diffusion Transmittance

Diffusion transmittance was measured by using a turbidimeter (Part No.: NDH-5000; manufactured by NIPPON DENSHOKU INDUSTRIES CO., LTD.) in accordance with JIS K 7361-1.

(4) Image Clarity

Image clarity is a value of definition (%) when measured by using an image clarity measuring device (Part No.: ICM-IT; manufactured by Suga Test Instruments Co., Ltd.), with an optical comb having a width of 0.125 mm in accordance with JIS K7374. The larger the value of the definition, the higher is the transmitted image clarity.

(5) Foreign Substance

Visually identifiable large aggregate (a foreign substance) was counted from a 20 cm squares-cut transparent light scattering layer as prepared below. Visual evaluation was performed using the following criteria for the number of the foreign substance based on how little the number was.

[Evaluation Criteria]

⊚: 0 to 5 foreign substance(s)

○: 6 to 20 foreign substances

×: 21 or more foreign substances (6) Screen Performance

An image was projected at an angle of 15 degrees against the normal line direction of the transparent screen from a position 50 cm away using a mobile LED mini projector PP-D1S, manufactured by Onkyo Digital Solutions Co., Ltd. Next, a focus knob of the projector was adjusted so that the focus was located on the screen surface. Subsequently, an image was projected on the screen from two positions: 1 m frontward from the screen (the same side as the projector against the screen, the so-called front projection) and 1 m backward from the screen (the opposite side from the projector, the so-called rear projection). The image was evaluated by visual inspection based on the following criteria. Inspection from the front of the screen allows evaluation for performance as the reflection type screen and inspection from the rear side allows evaluation for performance as the transmission type screen.

[Evaluation Criteria]

⊚: The image was visibly recognized in an extremely clear manner.

○: The image was visibly recognized in a clear manner.

Δ: The image was visibly recognized with a relatively fuzzy outline and color phase.

×: The image had a fuzzy outline and the screen was not suitable for use.

(7) Cured Film

The dispersion liquids obtained by the following Examples and Comparative Examples were cured and produced into 2 μm-thick cured films on the substrates. The haze values of the produced cured films with glass plates were measured as like the above-described (1) and the haze values for the 2 μm-thick cured films were determined (since the haze value of the glass plate is almost 0, it has no substantial effect on the haze value of the cured film).

<Manufacturing of Transparent Screen>

Example 1

To chloroform, a thermoplastic resin (a PMMA resin, manufactured by Mitsubishi Rayon Co., Ltd., trade name: ACRYPET VH) as a binder and 0.30% by mass of zirconium oxide ($ZrO_2$) powder (median diameter of the primary particles: 11 nm, refractive index: 2.40), based on the PMMA pellet as substantially spherical microparticles, were added and homogeneously stirred to obtain a resin composition for the transparent light scattering layer (dispersion liquid, concentration of solid 20% by mass). The obtained resin composition for the transparent light scattering layer was coated on a 3 mm-thick float plate glass with a bar coater and cured by removing chloroform under the condition of 24 hours room-temperature drying and reduced pressure (by using a Compact type vacuum drying oven manufactured by YAMATO SCIENTIFIC CO., LtD. for 24 hours at 70° C. with 0.1 kPa) to produce a transparent light scattering layer consisted of a 20 μm-thick cured film. The thickness t (μm) of the cured film (the transparent light scattering layer) and the concentration c (% by mass) of the substantially spherical microparticles resulted in t×c=6.

When the float plate glass with the obtained transparent light scattering layer was used directly as a screen, the haze value was 10%, the total light transmittance was 89%, the diffusion transmittance was 9%, and the transparency was high.

The number of foreign substances measured in accordance with the above-described method was 3 and small, resulting in excellent transparency. The image clarity was 90% and the image seen transmitted through the screen was clear. Further, the screen performance was evaluated and the image was sufficiently formed on the screen when inspected both from the front side and from the rear side. Especially, an extremely clear image was visibly recognized when inspected from the rear side. Therefore, it was possible to visibly recognize a clear background image and a clear projected image at the same time.

Example 2

As a binder, a solgel material (a mixture obtained by titrating and stirring 54.3 parts by mass of tetraethoxysilane (TEOS) and 45.7 parts by mass of methyltriethoxysilane (MTES) to a mixed solution of 530 parts by mass of ethanol, 45 parts by mass of water, and 0.2 part by mass of concentrated hydrolic acid) was used and instead of $ZrO_2$, 0.30% by mass of flake-form aluminum microparticles A (a primary particle with an average diameter of 1 μm, aspect ratio of 25, and regular reflectance of 16.8%), based on the solid content of the solgel material, was added as bright flake-form microparticles to obtain a solgel composition for the transparent light scattering layer (a dispersion liquid). Said solgel composition for the transparent light scattering layer was coated on float plate glass A for 10 seconds at a rotating speed of 500 rpm using a spin coater, followed by coating for further 45 seconds at 800 rpm. The obtained coated film was dried at room temperature, and further dried by heating for 10 minutes in a 250° C. drying oven to produce a transparent light scattering layer consisted of a 2 μm-thick cured film. The thickness t (μm) of the cured film (the transparent light scattering layer) and the concentration c (% by mass) of the bright flake-form microparticles resulted in t×c=0.6.

When the float plate glass with the obtained transparent light scattering layer was used directly as a screen, the haze value was 7%, the total light transmittance was 84%, the diffusion transmittance was 6%, and the transparency was high.

The number of foreign substances measured in accordance with the above-described method was 4 and small, resulting in excellent transparency. The image clarity was 86% and the image seen transmitted through the screen was clear. Further, the screen performance was evaluated and the image was sufficiently formed on the screen when inspected both from the front side and from the rear side. Especially, an extremely clear image was visibly recognized when inspected from the front side. Therefore, it was possible to visibly recognize a clear background image and a clear projected image at the same time.

Example 3

As a binder, liquid glass (a sodium silicate solution, manufactured by Kishida Chemical Co., Ltd., product name: Liquid Glass No. 3) was used, and $ZrO_2$ was added in a concentration of 0.75% by mass, based on the solid content of liquid glass, and further, isopropyl alcohol was added such that the concentration of the solid content becomes 20% by mass to prepare a liquid glass composition for the transparent light scattering layer (a dispersion liquid). Said dispersion liquid glass composition for the transparent light scattering layer was spray coated on a float plate glass using a spraying device (manufactured by TORAY ENGINEERING CO., LTD., an electrospray coating device). After coating, the coated film was dried by heat treatment for 10 minutes at 100° C. on a hot plate, and then further dried for 10 minutes in a 250° C. drying oven to produce a transparent light scattering layer consisted of a 5 μm-thick cured film. The thickness t (μm) of the cured film (the transparent light scattering layer) and the concentration c (% by mass) of the substantially spherical microparticles resulted in t×c=3.75.

When the float plate glass with the obtained transparent light scattering layer was used directly as a screen, the haze value was 3%, the total light transmittance was 95%, the diffusion transmittance was 3%, and the transparency was high.

The number of foreign substances measured in accordance with the above-described method was 3 and small, resulting in excellent transparency. The image clarity was 90% and the image seen transmitted through the screen was clear. Further, the screen performance was evaluated and the image was sufficiently formed on the screen when inspected both from the front side and from the rear side. Especially, an extremely clear image was visibly recognized when inspected from the rear side. Therefore, it was possible to visibly recognize a clear background image and a clear projected image at the same time.

Example 4

As a binder, a commercially available polymer acrylate type UV curable resin (UNIDIC V-6841, manufactured by DIC CORPORATION) was used and 0.6% by mass of zirconium oxide (ZrO2) powder (a primary particle with a median diameter of 11 nm, and refractive index of 2.40), based on the weight of the solid content in the UV curable resin, was added to prepare dispersion liquid A. Further, 5 parts by weight of a photopolymerization initiator (Irgacure 184, manufactured by BASF Japan K.K.) was added, based on 100 parts by weight of this dispersion liquid to obtain dispersion liquid B with a light-curing property. Using a bar coater, the obtained dispersion liquid B was coated on a 3 mm-thick float plate glass such that the thickness after dryness will be 10 μm, dried for 5 minutes with a 70° C. hot air drying machine, and then irradiated with ultra violet rays to produce a transparent light scattering layer. The thickness t (μm) of the cured film (the transparent light scattering layer) and the concentration c (% by mass) of the substantially spherical microparticles resulted in t×c=6.

When the float plate glass with the obtained transparent light scattering layer was used directly as a screen, the haze value was 8%, the total light transmittance was 90%, the diffusion transmittance was 7%, and the transparency was high.

The number of foreign substances measured in accordance with the above-described method was 2 and small, resulting in excellent transparency. The image clarity was 87% and the image seen transmitted through the screen was clear. Further, the screen performance was evaluated and the image was sufficiently formed on the screen when inspected both from the front side and from the rear side. Especially, an extremely clear image was visibly recognized when inspected from the rear side. Therefore, it was possible to visibly recognize a clear background image and a clear projected image at the same time. The cured film had a pencil hardness of 2H, resulting in a sufficient abrasion-resistance.

Example 5

A transparent light scattering layer consisted of a 20 μm thick cured film was produced in the similar manner as Example 1, except that the added amount of the $ZrO_2$ as the substantially spherical microparticles was changed to 0.65% by mass and that dispersion liquid C was used to which 0.03% by mass of flake-form aluminum microparticles A were added. The thickness t (μm) of the cured film (the transparent light scattering layer) and the concentration c (% by mass) of the substantially spherical microparticles and the bright flake-form microparticles resulted in t×c=13.6.

When the float plate glass with the obtained transparent light scattering layer was used directly as a screen, the haze value was 12%, the total light transmittance was 78%, the diffusion transmittance was 9%, and the transparency was high.

The number of foreign substances measured in accordance with the above-described method was 3 and small, resulting in excellent transparency. The image clarity was 85% and the image seen transmitted through the screen was clear. Further, the screen performance was evaluated and the image was sufficiently formed on the screen when inspected both from the front side and from the rear side. An extremely clear image was also visibly recognized when inspected both from the front side and from the rear side. Therefore, it was possible to visibly recognize a clear background image and a clear projected image at the same time.

Example 6

As a binder, a commercially available acryl lacquer (RECRACK 73 Clear, manufactured by FUJIKURA KASEI CO., LTD.) was used and as bright flake-form microparticles, 0.02% by mass of flake-form aluminum microparticles A, based on the weight of the solid content in the lacquer, were added to prepare dispersion liquid D. Further, based on 100 parts by weight of this dispersion liquid D, 100 parts by mass of thinner as a solvent (RECRACK #5975 Thinner, manufactured by FUJIKURA KASEI CO., LTD.) was added to adjust the viscosity, and using an air brush, this was spray coated on a polymethyl (meth)acrylate resin substrate (a PMMA substrate, thickness of 5 mm) such that the thickness of the coated film after dryness will be 20 μm, followed by 5 minutes of drying in a 70° C. hot air drying machine to produce a transparent light scattering layer. The thickness t (μm) of the cured film (the transparent light scattering layer) and the concentration c (% by mass) of the bright flake-form microparticles resulted in t×c=0.4.

When the PMMA substrate with the obtained transparent light scattering layer was used directly as a screen, the haze value was 6%, the total light transmittance was 87%, the diffusion transmittance was 5%, and the transparency was high.

The number of foreign substances measured in accordance with the above-described method was 3 and small, resulting in excellent transparency. The image clarity was 88% and the image seen transmitted through the screen was clear. Further, the screen performance was evaluated and the image was sufficiently formed on the screen when inspected both from the front side and from the rear side. Especially, an extremely clear image was visibly recognized when inspected from the front side. Therefore, it was possible to visibly recognize a clear background image and a clear projected image at the same time.

Example 7

A transparent light scattering layer was produced in the similar manner as Example 6, except that dispersion liquid D was spray coated with an air brush on a 5 mm-thick PMMA substrate such that the thickness of the coated film of the transparent light scattering layer will be 40 μm after dryness. The thickness t (μm) of the cured film (the transparent light scattering layer) and the concentration c (% by mass) of the bright flake-form microparticles resulted in t×c=0.8. When the PMMA substrate with the obtained transparent light scattering layer was used directly as a screen, the haze value was 9%, the total light transmittance was 83%, the diffusion transmittance was 8%, and the transparency was high.

The number of foreign substances measured in accordance with the above-described method was 4 and small, resulting in excellent transparency. The image clarity was 85% and the image seen transmitted through the screen was clear. Further, the screen performance was evaluated and the image was sufficiently formed on the screen when inspected both from the front side and from the rear side. Especially, an extremely clear image was visibly recognized when inspected from the front side. Therefore, it was possible to visibly recognize a clear background image and a clear projected image at the same time.

Example 8

Dispersion liquid E was produced in the similar manner as Example 6, except that the concentration of flake-form aluminum microparticles A was changed to 0.005% by mass and further the amount of thinner was changed to 80 parts by mass, and dispersion liquid E was spray coated with an air brush on a PMMA substrate (5 mm-thick) such that the thickness of the film will be 100 μm after dryness, dried for 5 minutes in a 70° C. hot air drying machine to produce a transparent light scattering layer. The thickness t (μm) of the cured film (the transparent light scattering layer) and the concentration c (% by mass) of the bright flake-form microparticles resulted in t×c=0.5.

When the PMMA substrate with the obtained transparent light scattering layer was used directly as a screen, the haze value was 9%, the total light transmittance was 82%, the diffusion transmittance was 8%, and the transparency was high.

The number of foreign substances measured in accordance with the above-described method was 5 and small, resulting in excellent transparency. The image clarity was 82% and the image seen transmitted through the screen was clear. Further, the screen performance was evaluated and the image was sufficiently formed on the screen when inspected both from the front side and from the rear side. Especially, an extremely clear image was visibly recognized when inspected from the front side. Therefore, it was possible to visibly recognize a clear background image and a clear projected image at the same time.

Example 9

As a binder, a commercially available urethane acrylate type UV curable resin (UNIDIC V-4018, manufactured by DIC CORPORATION) was used and 0.2% by mass of flake-form aluminum microparticles A, based on the weight of the solid content in the UV curable resin, were added to prepare dispersion liquid F. Further, 5 parts by weight of a photopolymerization initiator (Irgacure 184, manufactured by BASF Japan K.K.) was added, based on 100 parts by weight of this dispersion liquid F to obtain dispersion liquid G with a light-curing property. Using a bar coater, the obtained dispersion liquid G was coated on a 100 μm thick biaxially-stretched polyester film (Cosmoshine A4100, manufactured by TOYOBO CO., LTD.) such that the thickness of the film after dryness will be 2 μm, dried for 5 minutes with a 70° C. hot air drying machine, and then irradiated with ultra violet rays to produce a transparent light scattering layer. The thickness t (μm) of the cured film (the transparent light scattering layer) and the concentration c (% by mass) of the bright flake-form microparticles resulted in t×c=0.4.

When the polyester film with the obtained transparent light scattering layer was used directly as a screen, the haze value was 5%, the total light transmittance was 86%, the diffusion transmittance was 4%, and the transparency was high.

The number of foreign substances measured in accordance with the above-described method was 4 and small, resulting in excellent transparency. The image clarity was 89% and the image seen transmitted through the screen was clear. Further, the screen performance was evaluated and the image was sufficiently formed on the screen when inspected both from the front side and from the rear side. Especially, an extremely clear image was visibly recognized when inspected from the front side. Therefore, it was possible to visibly recognize a clear background image and a clear projected image at the same time. The cured film had a pencil hardness of 2H, resulting in a sufficient abrasion-resistance.

Example 10

As a binder, a commercially available two-pack type urethane coating (Multitop clear SH, manufactured by ROCK PAINT CO., LTD.) was used and as the bright flake-form microparticles, 0.03% by mass of flake-form aluminum microparticles A were added to prepare dispersion liquid H. Further, 50 parts by weight of a curing agent (Multitop S curing agent, manufactured by ROCK PAINT CO., LTD.) and 20 parts by weight of thinner (ROCK ACE Thinner, manufactured by ROCK PAINT CO., LTD.) were added, based on 100 parts by weight of this dispersion liquid H to prepare dispersion liquid I. Using an air brush, the obtained dispersion liquid I was spray coated on a float plate glass such that the thickness of the film after dryness will be 15 μm, and dried for 5 minutes with a 70° C. hot air drying machine to produce a transparent light scattering layer. The thickness t (μm) of the cured film (the transparent light scattering layer) and the concentration c (% by mass) of the bright flake-form microparticles resulted in t×c=0.45.

When the glass plate with the obtained transparent light scattering layer was used directly as a screen, the haze value was 5%, the total light transmittance was 89%, the diffusion transmittance was 5%, and the transparency was high.

The number of foreign substances measured in accordance with the above-described method was 2 and small, resulting in excellent transparency. The image clarity was 90% and the image seen transmitted through the screen was clear. Further, the screen performance was evaluated and the image was sufficiently formed on the screen when inspected both from the front side and from the rear side. Especially, an extremely clear image was visibly recognized when inspected from the front side. Therefore, it was possible to visibly recognize a clear background image and a clear projected image at the same time.

Example 11

As a binder, a commercially available urethane acrylate type UV curable resin (UNIDIC V-4018, manufactured by DIC CORPORATION) was used and 1.2% by mass of nickel microparticles (bright flake-form microparticles with a primary particle in an average diameter of 9 μm, aspect ratio of 90, and regular reflectance of 16.8%), based on the weight of the solid content in the UV curable resin, were added to prepare dispersion liquid J. Further, 5 parts by weight of a photopolymerization initiator (Irgacure 184, manufactured by BASF Japan K.K.) was added, based on 100 parts by weight of this dispersion liquid J to obtain dispersion liquid K with a light-curing property. Using a bar coater, the obtained dispersion liquid K was coated on a 100 μm thick biaxially-stretched polyester film (Cosmoshine A4100, manufactured by TOYOBO CO., LTD.) such that the thickness of the film after dryness will be 5 μm, dried for 5 minutes with a 70° C. hot air drying machine, and then irradiated with ultra violet rays to produce a transparent light scattering layer. The thickness t (μm) of the cured film (the transparent light scattering layer) and the concentration c (% by mass) of the bright flake-form microparticles resulted in t×c=6.

When the polyester film with the obtained transparent light scattering layer was used directly as a screen, the haze value was 18%, the total light transmittance was 83%, the diffusion transmittance was 15%, and the transparency was high.

The number of foreign substances measured in accordance with the above-described method was 3 and small, resulting in excellent transparency. The image clarity was 74% and the image seen transmitted through the screen was clear. Further, the screen performance was evaluated and the image was sufficiently formed on the screen when inspected both from the front side and from the rear side. An extremely clear image was also visibly recognized when inspected both from the front side and from the rear side. Therefore, it was possible to visibly recognize a clear background image and a clear projected image at the same time. The cured film had a pencil hardness of 2H, resulting in a sufficient abrasion-resistance.

Example 12

Dispersion liquid L was produced in the similar manner as Example 6, except that the concentration of flake-form aluminum microparticles A was changed to 0.80% by mass. The obtained dispersion liquid L was used for spray coating a PMMA substrate with an air brush, such that the film thickness after dryness will be 10 μm, and dried for 5 minutes with a 70° C. hot air drying machine to produce a transparent light scattering layer. The thickness t (μm) of the cured film (the transparent light scattering layer) and the concentration c (% by mass) of the bright flake-form microparticles resulted in t×c=8.

When the PMMA substrate with the obtained transparent light scattering layer was used directly as a screen, the haze value was 20%, the total light transmittance was 75%, the diffusion transmittance was 15%, and the transparency was high.

The number of foreign substances measured in accordance with the above-described method was 4 and small, resulting in excellent transparency. The image clarity was 73% and the image seen transmitted through the screen was clear. Further, the screen performance was evaluated and the image was sufficiently formed on the screen when inspected both from the front side and from the rear side. An extremely clear image was also visibly recognized when inspected both from the front side and from the rear side. Therefore, it was possible to visibly recognize a clear background image and a clear projected image at the same time.

Example 13

Dispersion liquid M was produced in the similar manner as Example 6, except that the concentration of flake-form aluminum microparticles A was changed to 0.01% by mass. The obtained dispersion liquid M was used for spray coating a PMMA substrate with an air brush, such that the film thickness after dryness will be 50 μm, and dried for 5 minutes with a 70° C. hot air drying machine to produce a transparent light scattering layer. The thickness t (μm) of the cured film (the transparent light scattering layer) and the concentration c (% by mass) of the bright flake-form microparticles resulted in t×c=0.5.

When the PMMA substrate with the obtained transparent light scattering layer was used directly as a screen, the haze value was 6%, the total light transmittance was 87%, the diffusion transmittance was 5%, and the transparency was high.

The number of foreign substances measured in accordance with the above-described method was 2 and small, resulting in excellent transparency. The image clarity was 86% and the image seen transmitted through the screen was clear. Further, the screen performance was evaluated and the image was sufficiently formed on the screen when inspected both from the front side and from the rear side. Especially an extremely clear image was visibly recognized when inspected from the front side. Therefore, it was possible to visibly recognize a clear background image and a clear projected image at the same time.

Example 14

Dispersion liquid N was produced in the similar manner as Example 1, except that 2.5% by mass of silver microparticles (a primary particle with an average diameter of 1 μm, aspect ratio of 200, and regular reflectance of 32.8%) were used as the bright flake-form microparticles. The obtained dispersion liquid N was used to prepare a transparent light scattering layer on a 3 mm-thick float plate glass, such that the film thickness after dryness will be 5 μm, in the similar manner as Example 1. The thickness t (μm) of the cured film (the transparent light scattering layer) and the concentration c (% by mass) of the bright flake-form microparticles resulted in t×c=12.5.

When the float plate glass with the obtained transparent light scattering layer was used directly as a screen, the haze value was 15%, the total light transmittance was 74%, the diffusion transmittance was 11%, and the transparency was high.

The number of foreign substances measured in accordance with the above-described method was 5 and small, resulting in excellent transparency. The image clarity was 70% and the image seen transmitted through the screen was clear. Further, the screen performance was evaluated and the image was sufficiently formed on the screen when inspected both from the front side and from the rear side. An extremely clear image was also visibly recognized when inspected both from the front side and from the rear side. Therefore, it was possible to visibly recognize a clear background image and a clear projected image at the same time.

Example 15

Dispersion liquid O was produced in the similar manner as Example 1, except that the concentration of zirconium oxide powders ($ZrO_2$) was changed to 0.01% by mass. A transparent light scattering layer was prepared in the similar manner as Example 1, except that the obtained dispersion liquid O was used such that the film thickness after dryness will be 30 μm. The thickness t (μm) of the cured film (the transparent light scattering layer) and the concentration c (% by mass) of the substantially spherical microparticles resulted in t×c=0.3. When the float plate glass with the obtained transparent light scattering layer was used directly as a screen, the haze value was 0.5%, the total light transmittance was 94%, the diffusion transmittance was 0.5%, and the transparency was high.

The number of foreign substances measured in accordance with the above-described method was 2 and small, resulting in excellent transparency. The image clarity was 91% and the image seen transmitted through the screen was clear. Further, the screen performance was evaluated and the image was sufficiently formed on the screen when inspected both from the front side and from the rear side. Especially, an extremely clear image was visibly recognized when inspected from the rear side. Therefore, it was possible to visibly recognize a clear background image and a clear projected image at the same time.

Example 16

Dispersion liquid P was produced in the similar manner as Example 2, except that 2.0% by mass of zirconium oxide powders ($ZrO_2$) (a primary particle with a median diameter of 11 nm, and refractive index of 2.40) were used as the substantially spherical microparticles. The obtained dispersion liquid P was used to prepare a transparent light scattering layer on a 3 mm-thick float plate glass, such that the film thickness after dryness will be 1 μm, in the similar manner as Example 2. The thickness t (μm) of the cured film (the transparent light scattering layer) and the concentration c (% by mass) of the substantially spherical microparticles resulted in t×c=2.

When the float plate glass with the obtained transparent light scattering layer was used directly as a screen, the haze value was 2%, the total light transmittance was 92%, the diffusion transmittance was 2%, and the transparency was high.

The number of foreign substances measured in accordance with the above-described method was 5 and small, resulting in excellent transparency. The image clarity was 92% and the image seen transmitted through the screen was clear. Further, the screen performance was evaluated and the image was sufficiently formed on the screen when inspected both from the front side and from the rear side. Especially, an extremely clear image was visibly recognized when inspected from the rear side. Therefore, it was possible to visibly recognize a clear background image and a clear projected image at the same time.

Example 17

As a binder, a commercially available epoxy acrylate type UV curable resin (UNIDIC V-5500, manufactured by DIC CORPORATION) was used and zirconium oxide powders ($ZrO_2$) (a primary particle with a median diameter of 11 nm, and refractive index of 2.40) were added in an amount of 0.60% by mass based on the weight of the solid content in the UV curable resin to prepare dispersion liquid Q. Further, 5 parts by weight of a photopolymerization initiator (Irgacure 184, manufactured by BASF Japan K.K.) was added, based on 100 parts by weight of this dispersion liquid Q to obtain dispersion liquid R with a light-curing property. Using a bar coater, the obtained dispersion liquid R was coated on a 3 mm float plate glass such that the thickness of the film after dryness will be 10 µm, dried for 5 minutes with a 70° C. hot air drying machine, and then irradiated with ultra violet rays to produce a transparent light scattering layer. The thickness t (µm) of the cured film (the transparent light scattering layer) and the concentration c (% by mass) of the substantially spherical microparticles resulted in t×c=6.

When the float plate glass with the obtained transparent light scattering layer was used directly as a screen, the haze value was 8%, the total light transmittance was 87%, the diffusion transmittance was 7%, and the transparency was high.

The number of foreign substances measured in accordance with the above-described method was 3 and small, resulting in excellent transparency. The image clarity was 85% and the image seen transmitted through the screen was clear. Further, the screen performance was evaluated and the image was sufficiently formed on the screen when inspected both from the front side and from the rear side. Especially, an extremely clear image was visibly recognized when inspected from the rear side. Therefore, it was possible to visibly recognize a clear background image and a clear projected image at the same time. The cured film had a pencil hardness of HB, resulting in a sufficient abrasion-resistance.

Example 18

As a binder, a commercially available polymer acrylate type UV curable resin (UNIDIC V-6841, manufactured by DIC CORPORATION) was used and 5.0% by mass of titanium oxide ($TiO_2$) powders (manufactured by TAYCA CORPORATION, a primary median diameter of 13 nm and a refractive index of 2.72), based on the weight of the solid content in the UV curable resin, were added to prepare dispersion liquid S. Further, parts by weight of a photopolymerization initiator (Irgacure 184, manufactured by BASF Japan K.K.) was added, based on 100 parts by weight of this dispersion liquid S to obtain dispersion liquid T with a light-curing property. Using a bar coater, the obtained dispersion liquid T was coated on a 3 mm-thick float plate glass such that the thickness of the film after dryness will be 5 µm, dried for 5 minutes with a 70° C. hot air drying machine, and then irradiated with ultra violet rays to produce a transparent light scattering layer. The thickness t (µm) of the cured film (the transparent light scattering layer) and the concentration c (% by mass) of the substantially spherical microparticles resulted in t×c=25.

When the float plate glass with the obtained transparent light scattering layer was used directly as a screen, the haze value was 20%, the total light transmittance was 71%, the diffusion transmittance was 14%, and the transparency was high.

The number of foreign substances measured in accordance with the above-described method was 5 and small, resulting in excellent transparency. The image clarity was 65% and the image seen transmitted through the screen was clear. Further, the screen performance was evaluated and the image was sufficiently formed on the screen when inspected both from the front side and from the rear side. Especially, an extremely clear image was visibly recognized when inspected from the front side. Therefore, it was possible to visibly recognize a clear background image and a clear projected image at the same time. The cured film had a pencil hardness of 2H, resulting in a sufficient abrasion-resistance.

Example 19

As a binder, a commercially available acryl lacquer (RECRACK 73 Clear, manufactured by FUJIKURA KASEI CO., LTD.) was used and as the bright flake-form microparticles, 0.1% by mass of flake-form aluminum microparticles B (a primary particle with an average diameter of 10 µm, aspect ratio of 300, regular reflectance of 62.8%), based on the weight of the solid content in the lacquer, were added to prepare dispersion liquid U. Further, based on 100 parts by weight of this dispersion liquid U, 100 parts by mass of thinner as a solvent (RECRACK #5975 Thinner, manufactured by FUJIKURA KASEI CO., LTD.) was added to adjust the viscosity, and then using an air brush, this was spray coated on a polymethyl (meth)acrylate resin substrate (a PMMA substrate, 5 mm-thick) such that the thickness of the coated film after dryness will be 3 µm, and dried for 5 minutes with a 70° C. hot air drying machine to produce a transparent light scattering layer. The thickness t (µm) of the cured film (the transparent light scattering layer) and the concentration c (% by mass) of the bright flake-form microparticles resulted in t×c=0.3. The cured film had a pencil hardness of H, resulting in a sufficient abrasion-resistance.

When the PMMA substrate with the obtained transparent light scattering layer was used directly as a screen, the haze value was 2%, the total light transmittance was 91%, the diffusion transmittance was 2%, and the transparency was high. The number of foreign substances measured in accordance with the above-described method was 3 and small, resulting in excellent transparency. The image clarity was 91% and the image seen transmitted through the screen was clear. Further, the screen performance was evaluated and the image was sufficiently formed on the screen. An extremely clear image was also visibly recognized when inspected both from the front side and from the rear side. Therefore, it was possible to visibly recognize a clear background image and a clear projected image at the same time.

Comparative Example 1

As like Example 1, to a thermoplastic resin (a PMMA resin) as a binder, were added as substantially spherical microparticles, 5% by mass of $ZrO_2$, based on the PMMA resin, and were introduced into a twin-screw kneading extruder KZW-30MG, manufactured by TECHNOVEL CORPORATION. Melt-kneading was performed at 250° C. and the extruded strand was pelletized to obtain a $ZrO_2$-containing PMMA pellet. Said $ZrO_2$-containing PMMA pellet was introduced into a single-screw kneading extruder (manufactured by GM K.K.) to form a 20 µm-thick transparent light diffusion layer (film). The single-screw kneading extruder had a screw diameter of 50 mm and an effective length (L/D) of 30, and a hangar coat type T-die was arranged on the extruder via an adapter. The thickness t (µm) of the film (the transparent light scattering layer) and the concentration c (% by mass) of the substantially spherical microparticles resulted in t×c=100.

When the produced light diffusion layer was attached to a float plate glass via an acrylic adhesive and used as a transparent screen, the haze value was 6%, the total light transmittance was 89%, and the diffusion transmittance was 5%. Further, the number of foreign substances was 71 and large, the image clarity was 63%, and the image seen transmitted through the screen was unclear. Therefore, it was not possible to visibly recognize a clear background image and a clear projected image at the same time.

Comparative Example 2

Dispersion liquid V was prepared in the similar manner as Example 6, except that the bright flake-form microparticles were not added and mica particles (product name: A-21S, manufactured by YAMAGUCHI MICA CO., LTD., a primary particle with an average diameter of 23 μm, aspect ratio of 70, and regular reflectance of 9.8%) were added in 0.65% by mass based on the binder, as the flake-form microparticles without a brilliance property. A transparent light scattering layer was prepared in the similar manner as Example 6, except that the obtained dispersion liquid V was used such that the film thickness after dryness will be 50 μm. The thickness t (μm) of the cured film (the transparent light scattering layer) and the concentration c (% by mass) of the mica particles resulted in t×c=32.5.

When the produced transparent light scattering layer was used directly as a transparent screen, the haze value was 33%, the diffusion transmittance was 21%, the total light transmittance was 65%, and the screen was not transparent.

The number of foreign substances measured in accordance with the above-described method was 6. The image clarity was 58%, and the image seen transmitted through the screen was unclear. Further, the screen performance was evaluated and although the image was sufficiently formed on the screen when inspected from the rear side, a clear image was not visibly recognized when inspected from the front side.

<Evaluation of Processing Suitability>

Reference Example 1

The UV curable resin composition for the transparent light scattering layer as produced in Example 4 was coated on a float plate glass in a film thickness of 10 μm and dried for 1 minute at 80° C. The obtained transparent light scattering layer and microstructural mold A (part number: HT-AR-05C, manufactured by InnoX Co., Ltd., pitch 250 nm, average height 300 nm, peak distance 290 nm) were set into a nanoimprint apparatus (type number: ImpFlexI-Essential, manufactured by Sanmei Electronics Co., Ltd.), pressurized with a pressure of 1 MP, irradiated with light from a light source of LED 365 nm for 60 seconds to perform curing reaction of the UV curable resin composition. The used microstructural mold was subjected with demolding treatment by fluorine-based surface treatment (part number: OPTOOL HD-1100 TH, manufactured by DAIKIN INDUSTRIES, LTD.) beforehand. Subsequently, the mold was released and a transparent light scattering layer was obtained imparted with a concave-convex microstructure. The concave-convex microstructure of the obtained transparent light scattering layer was observed with a microscope (product name: E-sweep, manufactured by SII Nanotechnolody K.K.) and the obtained microstructural layer had an average peak distance of 282 nm and an average peak height of 281 nm. It was found that a transparent screen was obtained having a concave-convex microstructure almost in accordance with the mold.

Reference Example 2

In Comparative Example 1, a microstructural mold (part number: HT-AR-05C, manufactured by InnoX Co., Ltd., pitch 250 nm, average height 300 nm, peak distance 290 nm) was pressed against a melted resin just extruded from a T-die, obtained by introducing a $ZrO_2$-containing PMMA pellet into a single-screw extruding hopper to perform a micro concave-convex processing. A transparent screen was obtained with only partially transferred concave-convex microstructure, as confirmed for the shape of the obtained transparent light diffusion layer (film) with a microscope (product name: E-sweep, manufactured by SII Nanotechnolody K.K.).

Reference Example 3

When dispersion liquid D as produced in Example 6 was spray coated and dried on the inner side of an acryl resin-made fixture (a hemispherically-shape in a thickness of 2 mm and diameter of 150 mm), a transparent screen was able to be formed homogeneously on the spherical surface part. Therefore, dispersion liquid D is suitable for a curved surface processing.

Reference Example 4

The transparent screen as obtained in Comparative Example 1 was attached to the same type of an acryl resin-made fixture as Reference Example 3, using an adhesive; however, it was not possible to attach the transparent screen to the spherical surface part without any crinkles. Therefore, the transparent film obtained by extrusion molding is not suitable for a curved surface processing.

TABLE 3

| | transparent light scattering layer | | | | | cured film Haze at film thickness of 2 μm [%] | 透明スクリーン | | | | | Screen performance | |
|---|---|---|---|---|---|---|---|---|---|---|---|---|---|---|
| | microparticles | | Binder type | Thickness [μm] | Film type | Film formation method | t × c | | Total light transmittance [%] | Dispersion transmittance [%] | Image clarity [%] | Foreign substances | Visibility from the front side (reflection type) | Visibility from the rear side (transmission type) |
| | type | Concentration | | | | | | haze [%] | | | | | | |
| Example 1 | ZrO₂ | 0.30 | thermoplastic resin | 20 | cured film | coating | 6 | 2 | 10 | 89 | 9 | 90 | ◎ | ○ | ◎ |
| Example 2 | Al | 0.30 | solgel | 2 | cured film | coating | 0.6 | 7 | 7 | 84 | 6 | 86 | ◎ | ◎ | ○ |
| Example 3 | ZrO₂ | 0.75 | liquid glass | 5 | cured film | spray coating | 3.75 | 2 | 3 | 95 | 3 | 90 | ◎ | ○ | ◎ |
| Example 4 | ZrO₂ | 0.60 | UV curable resin | 10 | cured film | coating | 6 | 1 | 8 | 90 | 7 | 87 | ◎ | ○ | ◎ |
| Example 5 | Al ZrO₂ | 0.03 0.65 | thermoplastic resin | 20 | cured film | coating | 13.6 | 1 | 12 | 78 | 9 | 85 | ◎ | ◎ | ◎ |
| Example 6 | Al | 0.02 | thermoplastic resin | 20 | cured film | spray coating | 0.4 | 1 | 6 | 87 | 5 | 88 | ◎ | ◎ | ○ |
| Example 7 | Al | 0.02 | thermoplastic resin | 40 | cured film | spray coating | 0.8 | 1 | 9 | 83 | 8 | 85 | ◎ | ◎ | ○ |
| Example 8 | Al | 0.005 | thermoplastic resin | 100 | cured film | spray coating | 0.5 | 0.2 | 9 | 82 | 8 | 82 | ◎ | ◎ | ○ |
| Example 9 | Al | 0.2 | UV curable resin | 2 | cured film | coating | 0.4 | 5 | 5 | 86 | 4 | 89 | ◎ | ◎ | ○ |
| Example 10 | Al | 0.03 | Thermoset resin | 15 | cured film | spray coating | 0.45 | 1 | 5 | 89 | 5 | 90 | ◎ | ◎ | ○ |
| Example 11 | Ni | 1.2 | UV curable resin | 5 | cured film | coating | 6 | 9 | 18 | 83 | 15 | 74 | ◎ | ◎ | ◎ |
| Example 12 | Al | 0.80 | thermoplastic resin | 10 | cured film | spray coating | 8 | 5 | 20 | 75 | 15 | 73 | ◎ | ◎ | ◎ |
| Example 13 | Al | 0.01 | thermoplastic resin | 50 | cured film | spray coating | 0.5 | 0.2 | 6 | 87 | 5 | 86 | ◎ | ◎ | ○ |
| Example 14 | Ag | 2.5 | thermoplastic resin | 5 | cured film | coating | 12.5 | 8 | 15 | 74 | 11 | 70 | ◎ | ◎ | ◎ |
| Example 15 | ZrO₂ | 0.01 | thermoplastic resin | 30 | cured film | coating | 0.3 | 0.1 | 0.5 | 94 | 0.5 | 91 | ◎ | ○ | ◎ |
| Example 16 | ZrO₂ | 2.0 | solgel | 1 | cured film | coating | 2 | 4 | 2 | 92 | 2 | 92 | ◎ | ○ | ◎ |
| Example 17 | ZrO₂ | 0.60 | UV curable resin | 10 | cured film | coating | 6 | 2 | 8 | 87 | 7 | 85 | ◎ | ○ | ◎ |
| Example 18 | TiO₂ | 5.0 | UV curable resin | 5 | cured film | coating | 25 | 8 | 20 | 71 | 14 | 65 | ◎ | ○ | ◎ |
| Example 19 | Al | 0.1 | thermoplastic resin | 3 | cured film | spray coating | 0.3 | 1 | 2 | 91 | 2 | 91 | ◎ | ◎ | ◎ |
| Comparative Example 1 | ZrO₂ | 5 | thermoplastic resin | 20 | Extrusion molded film | Melt extrusion | 100 | — | 6 | 89 | 5 | 63 | X | ○ | ◎ |
| Comparative Example 2 | Mica A-21S | 0.65 | thermoplastic resin | 50 | cured film | spray coating | 32.5 | 2 | 33 | 65 | 21 | 58 | ○ | X | ◎ |

DESCRIPTION OF SYMBOLS

10 Binder
11 Bright flake-form microparticles
12 Substantially spherical microparticles
13 Transparent light scattering layer
14,24 Viewer
15, 26A, 26B Projection light
16, 27A, 27B Scattering light
21 Transparent light scattering layer
22 Transparent partition (Support)
23 Transparent screen
25A,25B Projection device

The invention claimed is:

1. A dispersion liquid for forming a transparent light scattering layer of a transparent screen, comprising a binder and bright flake-form microparticles,
  wherein the bright flake-form microparticles comprise primary particles having an average diameter of from 0.5 to 100 μm and an average aspect ratio of from 3 to 800.

2. The dispersion liquid according to claim 1, wherein the binder is an inorganic binder or an organic binder.

3. The dispersion liquid according to claim 2, wherein the inorganic binder is liquid glass, a glass material having a low softening point, or a sol-gel material.

4. The dispersion liquid according to claim 2, wherein the organic binder is a thermoplastic resin, an ionizing radiation-curable resin, a thermoset resin, or an adhesive.

5. The dispersion liquid according to claim 1 further comprising a solvent.

6. The dispersion liquid according to claim 1, wherein the bright flake-form microparticles are metallic particles selected from the group consisting of aluminum, silver, copper, platinum, gold, titanium, nickel, tin, tin-cobalt alloy, indium, chromium, titanium oxide, aluminum oxide, and zinc sulfide, a bright material of a glass coated with metal or metal oxide, or a bright material of natural or synthetic mica coated with metal or metal oxide.

7. The dispersion liquid according to a claim 1, wherein the content of the bright flake-form microparticles in the dispersion liquid is from 0.0001 to 10.0% by mass based on the binder.

8. The dispersion liquid according to claim 1, wherein the dispersion liquid further comprises substantially spherical microparticles, and the substantially spherical microparticles comprise primary particles having average diameter of from 0.1 to 500 nm.

9. The dispersion liquid according to claim 8, wherein the substantially spherical microparticles are at least one kind selected from the group consisting of zirconium oxide, zinc oxide, cerium oxide, barium titanate, strontium titanate, magnesium oxide, barium sulfate, calcium carbonate, diamond, a cross-linked acrylic resin, a cross-linked styrene resin, and silica.

10. The dispersion liquid according to claim 8, wherein the content of the substantially spherical microparticles in the dispersion liquid is from 0.0001 to 20.0% by mass based on the binder.

11. The dispersion liquid according to claim 1, wherein when the dispersion liquid is cured and formed into a 2 μm-thick cured film, a haze value of the cured film is 30% or less.

12. A cured film of the dispersion liquid according to claim 1.

13. The cured film according to claim 12, wherein the thickness of the cured film t (μm) and the concentration c (% by mass) of the bright flake-form microparticles based on the binder satisfy the following formula (I):

$$0.05 \leq (t \times c) \leq 50 \tag{I}.$$

14. The cured film according to claim 12 having a haze value of 30% or less.

15. A transparent screen comprising a transparent light scattering layer comprised of the cured film according to claim 12.

16. A member for a vehicle comprising the transparent screen according to claim 15.

17. A member for a building comprising the transparent screen according to claim 15.

18. A video image projection system comprising the transparent screen according to claim 15 and a projection device.

19. A method for manufacturing a transparent screen comprising a transparent light scattering layer, the method comprising:
  forming a transparent light scattering layer comprised of a cured film by coating and curing the dispersion liquid according to claim 1 on a substrate.

* * * * *